United States Patent
Barnard et al.

(10) Patent No.: US 12,295,526 B2
(45) Date of Patent: May 13, 2025

(54) BLENDING SYSTEM WITH A LINER FOR BLENDING CONTAINER

(71) Applicant: VITA-MIX MANAGEMENT CORPORATION, Olmsted Township, OH (US)

(72) Inventors: John K. Barnard, Olmsted Township, OH (US); Eugene J. Kozlowski, Medina, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 17/560,740

(22) Filed: Dec. 23, 2021

(65) Prior Publication Data

US 2022/0110486 A1    Apr. 14, 2022

Related U.S. Application Data

(63) Continuation of application No. 15/817,608, filed on Nov. 20, 2017, now abandoned.
(Continued)

(51) Int. Cl.
    *A47J 43/046*    (2006.01)
    *A47J 43/042*    (2006.01)

(52) U.S. Cl.
    CPC .......... *A47J 43/046* (2013.01); *A47J 43/042* (2013.01)

(58) Field of Classification Search
    CPC ............................. A47J 43/042; A47J 43/046
    (Continued)

(56) References Cited

U.S. PATENT DOCUMENTS

| 181,013 | A | 8/1876 | Sawyer |
| 298,503 | A | 5/1884 | Rex |

(Continued)

FOREIGN PATENT DOCUMENTS

| CN | 200939970 | 8/2007 |
| CN | 200973620 | 11/2007 |

(Continued)

OTHER PUBLICATIONS

Copenheaver, Blaine, International Search Report and Written Opinion, PCT/US2014/029134, Aug. 1, 2014, International Search Authority/USA.

(Continued)

*Primary Examiner* — Marc C Howell
(74) *Attorney, Agent, or Firm* — Dinsmore & Shohl LLP

(57) ABSTRACT

A blending container for retaining foodstuff to be blended by a blender, the blending container may include an outer sleeve having an inner surface and at least one interlock tab extending therefrom. An inner liner having a wall that extends from a perimeter of a bottom to define a cavity to retain the foodstuff to be blended, wherein at least a portion of the wall of the inner liner frictionally engages against a portion of the inner surface of the outer sleeve. The inner liner may be made from a disposable material. The inner liner may include a rim that defines an opening such that the rim is configured to abut against a blade base. The inner liner may include a size of at least one of 8, 12, and 16 fluid ounces and the outer sleeve may be configured to receive the inner liner of various sizes.

19 Claims, 12 Drawing Sheets

Related U.S. Application Data

(60) Provisional application No. 62/423,807, filed on Nov. 18, 2016.

(58) Field of Classification Search
USPC .......................................................... 366/204
See application file for complete search history.

(56) References Cited

U.S. PATENT DOCUMENTS

| | | |
|---|---|---|
| 400,566 A | 4/1889 | Harry |
| 460,265 A | 9/1891 | Mulford |
| 698,755 A | 4/1902 | Stiehle |
| 742,955 A | 11/1903 | Augur |
| 747,249 A | 12/1903 | Smith |
| 796,692 A | 8/1905 | Scantlin |
| 937,772 A | 10/1909 | Cullen |
| 1,139,534 A | 5/1915 | Klenk |
| 1,380,066 A | 5/1921 | Johnson |
| 2,086,858 A | 7/1937 | Dunkelberger |
| 2,246,054 A | 6/1941 | Marty |
| 2,282,866 A | 5/1942 | Hagen |
| 2,404,915 A | 7/1946 | McCullough |
| D163,117 S | 5/1951 | Hobbs |
| 2,626,078 A | 1/1953 | Hutchisson |
| 2,628,081 A | 2/1953 | Laird |
| 2,711,644 A | 6/1955 | Myers |
| 2,761,659 A | 9/1956 | Collura |
| 2,774,576 A | 12/1956 | Frank |
| D180,096 S | 4/1957 | Moore |
| 2,798,701 A | 7/1957 | Collura |
| 2,860,550 A | 11/1958 | Stark |
| 2,897,862 A | 8/1959 | Malz |
| 2,924,349 A | 2/1960 | Huck |
| 2,954,174 A | 9/1960 | Polleys |
| 2,955,186 A | 10/1960 | Ritter |
| 3,064,949 A | 11/1962 | Dewenter |
| D198,303 S | 5/1964 | Dewenter |
| 3,175,594 A | 3/1965 | Ivar |
| 3,216,473 A | 11/1965 | Dewenter |
| 3,223,486 A | 12/1965 | Holl |
| D204,117 S | 3/1966 | Di Sesa |
| 3,240,246 A | 3/1966 | Dewenter |
| 3,299,226 A | 1/1967 | Edwards |
| 3,311,353 A | 3/1967 | Rogenski |
| D207,692 S | 5/1967 | Dykes |
| 3,342,425 A | 9/1967 | Morton |
| 3,355,045 A | 11/1967 | Douglas |
| 3,362,590 A | 1/1968 | Martin |
| 3,417,972 A | 12/1968 | Vincent |
| 3,419,196 A | 12/1968 | Moore |
| D217,178 S | 4/1970 | Crider |
| 3,548,280 A | 12/1970 | Cockroft |
| D220,416 S | 4/1971 | Folden |
| 3,612,126 A | 10/1971 | Emmons |
| 3,627,008 A | 12/1971 | Samuelian |
| 3,731,059 A | 5/1973 | Wilson |
| 3,738,583 A | 6/1973 | Berland |
| D227,535 S | 7/1973 | Grimes |
| D228,698 S | 10/1973 | Barnard |
| 3,812,995 A | 5/1974 | Lewis |
| D232,297 S | 8/1974 | Mantelet |
| 3,841,528 A | 10/1974 | Eisenberg |
| 3,873,435 A | 3/1975 | Ziebarth |
| 3,943,421 A | 3/1976 | Shibata et al. |
| 3,951,351 A | 4/1976 | Erster et al. |
| 3,963,220 A | 6/1976 | Ohchi |
| 4,087,053 A | 5/1978 | Voglesonger |
| D259,133 S | 5/1981 | Klawitter |
| 4,561,782 A | 12/1985 | Jacobsen |
| 4,568,193 A | 2/1986 | Contri et al. |
| D282,896 S | 3/1986 | Conti |
| D286,726 S | 11/1986 | Daenen |
| D287,324 S | 12/1986 | Schmidt |
| 4,655,373 A * | 4/1987 | Essen .................. A47G 19/12 |
| | | 222/465.1 |
| 4,660,733 A | 4/1987 | Snyder |
| 4,664,530 A | 5/1987 | Kurome |
| 4,671,452 A | 6/1987 | Pupp |
| 4,686,356 A | 8/1987 | Ueda et al. |
| 4,762,057 A | 8/1988 | Hirota et al. |
| 4,822,172 A | 4/1989 | Stottmann |
| 4,891,966 A | 1/1990 | Kramer |
| 4,893,942 A | 1/1990 | Stottmann |
| 4,911,557 A | 3/1990 | Dormer |
| D309,077 S | 7/1990 | Pomroy |
| 4,968,864 A | 11/1990 | Doi et al. |
| 4,981,365 A | 1/1991 | Bow |
| 5,156,867 A | 10/1992 | Leuthold et al. |
| D336,590 S | 6/1993 | Barnard |
| 5,219,419 A | 6/1993 | Prothe |
| 5,226,558 A | 7/1993 | Whitney |
| 5,267,211 A | 11/1993 | Kobayashi et al. |
| 5,267,790 A | 12/1993 | Sutherland et al. |
| 5,287,980 A | 2/1994 | Saltz |
| 5,316,382 A | 5/1994 | Penaranda et al. |
| 5,323,973 A | 6/1994 | Ferrara |
| 5,332,115 A | 7/1994 | Schafer |
| D350,451 S | 9/1994 | Dickson |
| 5,347,205 A | 9/1994 | Piland |
| 5,360,176 A | 11/1994 | Mugge |
| 5,363,746 A | 11/1994 | Gordon |
| 5,392,695 A | 2/1995 | Junkel |
| 5,397,022 A | 3/1995 | Schafer |
| 5,487,511 A | 1/1996 | Sansone |
| 5,531,153 A | 7/1996 | Maruyama et al. |
| 5,551,594 A | 9/1996 | Schafer |
| 5,556,198 A | 9/1996 | Dickson, Jr. et al. |
| 5,562,020 A | 10/1996 | Shigeshiro |
| 5,577,735 A | 11/1996 | Reed et al. |
| 5,589,119 A | 12/1996 | Hetherington |
| 5,605,090 A | 2/1997 | Mantani et al. |
| 5,616,083 A | 4/1997 | Subbaraman |
| 5,660,467 A | 8/1997 | Mineo et al. |
| 5,660,468 A | 8/1997 | Okajima |
| 5,678,726 A | 10/1997 | Porteous |
| 5,738,240 A | 4/1998 | Vavra |
| 5,768,978 A | 6/1998 | Dorner et al. |
| 5,823,382 A | 10/1998 | Van Giezen |
| 5,829,341 A | 11/1998 | Lin |
| 5,839,356 A | 11/1998 | Dornbush et al. |
| 5,888,565 A | 3/1999 | Gics |
| 5,957,577 A | 9/1999 | Dickson |
| 5,958,484 A | 9/1999 | Gics |
| 5,967,021 A | 10/1999 | Yung |
| 6,065,861 A | 5/2000 | Chen |
| D429,956 S | 8/2000 | Bohannon |
| D435,192 S | 12/2000 | Bohannon |
| D437,192 S | 2/2001 | Verherbrugghen |
| D437,731 S | 2/2001 | Thackray |
| 6,210,033 B1 | 4/2001 | Karkos, Jr. et al. |
| D452,296 S | 12/2001 | Egnell |
| 6,364,522 B2 | 4/2002 | Kolar et al. |
| 6,390,665 B1 | 5/2002 | Silveria |
| D458,723 S | 6/2002 | Malvasio |
| 6,402,365 B1 | 6/2002 | Wong |
| 6,609,821 B2 | 8/2003 | Wulf et al. |
| D480,904 S | 10/2003 | Backes |
| 6,632,013 B2 | 10/2003 | Wulf |
| 6,705,484 B2 | 3/2004 | Schäfer |
| 6,715,706 B1 | 4/2004 | Planca |
| D495,925 S | 9/2004 | Ulanski |
| 6,811,303 B2 | 11/2004 | Dickson |
| 6,854,876 B2 | 2/2005 | Dickson |
| D508,187 S | 8/2005 | Dais |
| D508,188 S | 8/2005 | Zettle |
| 6,959,562 B2 | 11/2005 | Navedo et al. |
| 6,979,117 B2 | 12/2005 | Dickson |
| D514,458 S | 2/2006 | Lawson |
| D514,868 S | 2/2006 | Achenbach |
| D521,316 S | 5/2006 | Katz |
| 7,047,872 B2 | 5/2006 | Mulle |
| 7,063,456 B2 | 6/2006 | Miller |
| D525,080 S | 7/2006 | Katz |
| D526,839 S | 8/2006 | Boozer |

(56) References Cited

U.S. PATENT DOCUMENTS

| | | | |
|---|---|---|---|
| D527,575 S | 9/2006 | Ulanski | |
| D527,588 S | 9/2006 | De Groote | |
| D528,363 S | 9/2006 | Ulanski | |
| 7,267,478 B2 | 9/2007 | Miller | |
| D552,916 S | 10/2007 | Bodum | |
| 7,275,666 B2 | 10/2007 | Rukavina | |
| 7,281,842 B2 | 10/2007 | Dickson | |
| 7,350,963 B2 | 4/2008 | Williams | |
| 7,357,273 B1 | 4/2008 | Lutz | |
| D577,545 S | 9/2008 | Ulanski | |
| 7,422,362 B2 | 9/2008 | Sands | |
| 7,520,659 B2 | 4/2009 | Wulf | |
| 7,530,510 B2* | 5/2009 | Newman | A47J 43/0727 241/37.5 |
| 7,632,007 B2 | 12/2009 | Wulf | |
| 7,648,264 B2 | 1/2010 | Breviere | |
| D637,862 S | 5/2011 | Fouquet | |
| D661,947 S | 6/2012 | Conti | |
| D664,808 S | 8/2012 | Dickson | |
| D672,617 S | 12/2012 | Stamper | |
| D673,010 S | 12/2012 | Stamper | |
| D705,606 S | 5/2014 | Coakley | |
| D708,903 S | 7/2014 | Wong | |
| D738,670 S | 9/2015 | Sands | |
| D742,172 S | 11/2015 | Dickson | |
| D753,482 S | 4/2016 | Serrano | |
| 9,370,280 B2 | 6/2016 | Conti | |
| D777,515 S | 1/2017 | Potter | |
| D782,247 S | 3/2017 | Kim | |
| D783,354 S | 4/2017 | Smith | |
| D783,356 S | 4/2017 | Kim | |
| D793,227 S | 8/2017 | Maskell | |
| D798,109 S | 9/2017 | Ulanski | |
| 2002/0009017 A1 | 1/2002 | Kolar et al. | |
| 2002/0141286 A1 | 10/2002 | Wulf | |
| 2002/0176320 A1 | 11/2002 | Wulf et al. | |
| 2003/0213373 A1 | 11/2003 | Dickson | |
| 2003/0214875 A1 | 11/2003 | Dickson | |
| 2004/0011798 A1 | 1/2004 | Dubois | |
| 2004/0100862 A1 | 5/2004 | Arroubi | |
| 2004/0203387 A1 | 10/2004 | Grannan | |
| 2005/0018534 A1 | 1/2005 | Nikkah | |
| 2005/0061821 A1 | 3/2005 | Smith | |
| 2005/0099884 A1 | 5/2005 | Lee | |
| 2005/0133514 A1 | 6/2005 | Schutz | |
| 2005/0229795 A1 | 10/2005 | Stuckey | |
| 2005/0258197 A1 | 11/2005 | Rukavina | |
| 2006/0039235 A1* | 2/2006 | McGill | A47J 43/046 366/279 |
| 2006/0086843 A1 | 4/2006 | Lin et al. | |
| 2006/0108372 A1 | 5/2006 | Aiken | |
| 2006/0169715 A1 | 8/2006 | Emmendorfer et al. | |
| 2006/0176765 A1 | 8/2006 | Pryor | |
| 2006/0203610 A1 | 9/2006 | Bohannon, Jr. et al. | |
| 2006/0209627 A1* | 9/2006 | McGill | A47J 43/0761 366/205 |
| 2006/0214765 A1 | 9/2006 | Pitchers et al. | |
| 2006/0261066 A1 | 11/2006 | Boozer | |
| 2007/0165484 A1 | 7/2007 | Branson | |
| 2007/0210194 A1 | 9/2007 | Carnevale | |
| 2007/0221668 A1 | 9/2007 | Baarman et al. | |
| 2008/0037360 A1* | 2/2008 | McGill | A23G 9/224 366/208 |
| 2008/0170465 A1 | 7/2008 | Bohannon | |
| 2009/0032551 A1 | 2/2009 | Mcginley | |
| 2009/0045229 A1 | 2/2009 | Mcginley | |
| 2009/0129200 A1 | 5/2009 | Breviere | |
| 2009/0238034 A1 | 9/2009 | Ulanski | |
| 2011/0046786 A1 | 2/2011 | Wulf | |
| 2011/0189358 A1 | 8/2011 | Herbert | |
| 2011/0199852 A1 | 8/2011 | Martin | |
| 2011/0210195 A1 | 9/2011 | Garcia | |
| 2011/0240624 A1 | 10/2011 | Zhang | |
| 2011/0248108 A1 | 10/2011 | Carriere | |
| 2012/0206995 A1 | 8/2012 | Wu | |
| 2013/0074706 A1 | 3/2013 | Fevre | |
| 2013/0153572 A1* | 6/2013 | Gillette | B01F 35/511 220/793 |
| 2013/0192477 A1 | 8/2013 | Hoare | |
| 2015/0250360 A1* | 9/2015 | Hyp | B01F 27/808 366/205 |
| 2015/0258514 A1* | 9/2015 | Boozer | A47J 43/0727 366/142 |
| 2016/0129409 A1* | 5/2016 | Drees | A47J 43/0722 366/241 |
| 2017/0208998 A1* | 7/2017 | Dickson, Jr. | A47J 43/0716 |
| 2017/0224169 A1 | 8/2017 | Kolar | |

FOREIGN PATENT DOCUMENTS

| | | |
|---|---|---|
| CN | 101194807 | 6/2008 |
| CN | 201899991 | 7/2011 |
| CN | 202312540 | 7/2012 |
| DE | 19539382 | 1/1997 |
| EP | 0963726 | 12/1999 |
| FR | 2585676 | 2/1987 |
| GB | 3013649 | 7/2003 |
| GB | 2398733 | 9/2004 |
| JP | 401145030 | 6/1989 |
| JP | H1145031 | 6/1989 |
| JP | 401310616 | 12/1989 |
| JP | 403193013 | 8/1991 |
| JP | 404017820 | 1/1992 |
| JP | 406178734 | 6/1994 |
| JP | H0937970 | 2/1997 |
| JP | 2002-210287 | 7/2002 |
| JP | 2005-04014 7 | 2/2005 |
| KR | 10-1995-0003546 | 2/1995 |
| KR | 20-1999-0001638 | 1/1999 |
| KR | 10-2001-0073392 | 8/2001 |
| KR | 10-2013-0085276 | 7/2013 |
| WO | WO9615706 | 5/1996 |
| WO | WO03001954 | 1/2003 |
| WO | WO2005031952 | 4/2005 |
| WO | WO2006104651 | 10/2006 |
| WO | WO2006124051 | 11/2006 |
| WO | WO2007061967 | 5/2007 |

OTHER PUBLICATIONS

Young, Lee W., International Search Report and Written Opinion, PCT/US2014/029384, Aug. 11, 2014, International Search Authority/USA.
Gaggia Espanola, S.A., ipanerma, brochure, undated.
Gaggia Espanola, S.A., Copacabana, brochure, undated.
Gaggia Espanola, S.A., ipanema Space-Saving High Technology, brochure, undated.
Young, Lee, International Search Report and Written Opinion, PCT/US2015/020769, Jun. 17, 2015, ISA/US, Alexandria, Virginia.
International Search Report for PCT/US2015/021663 dated Jun. 25, 2015.
Annex to Form PCT/ISA/206 Communication Relating to the Results of the Partial International Search (International Application No. PCT/US2009/001077—1 page from communication dated Jun. 29, 2009).

* cited by examiner

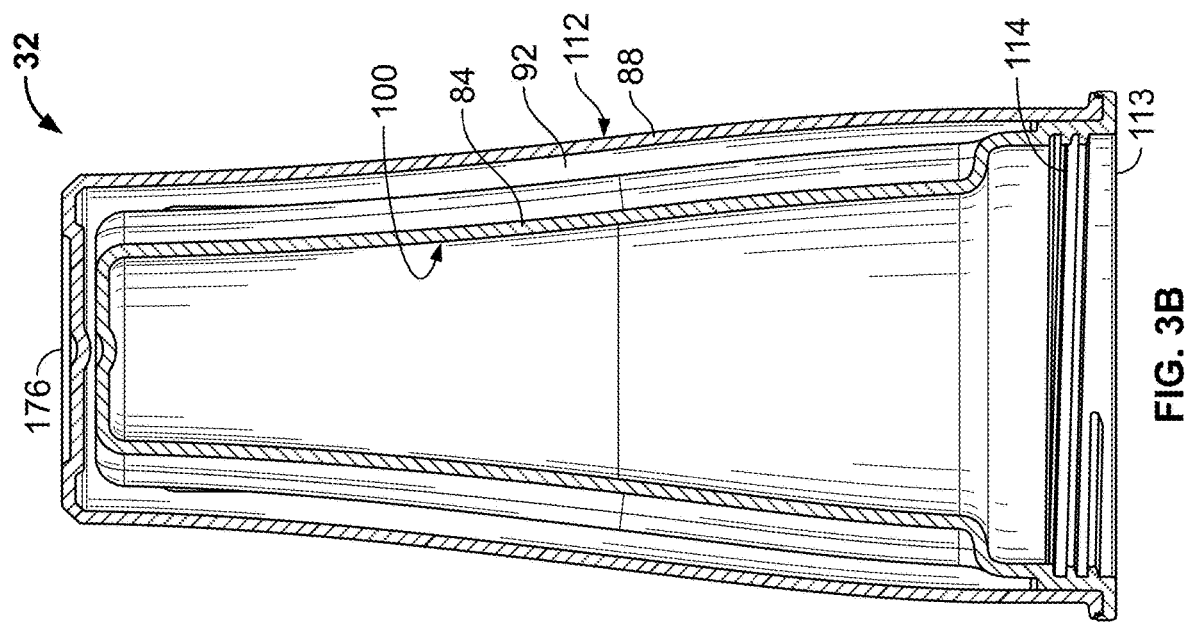
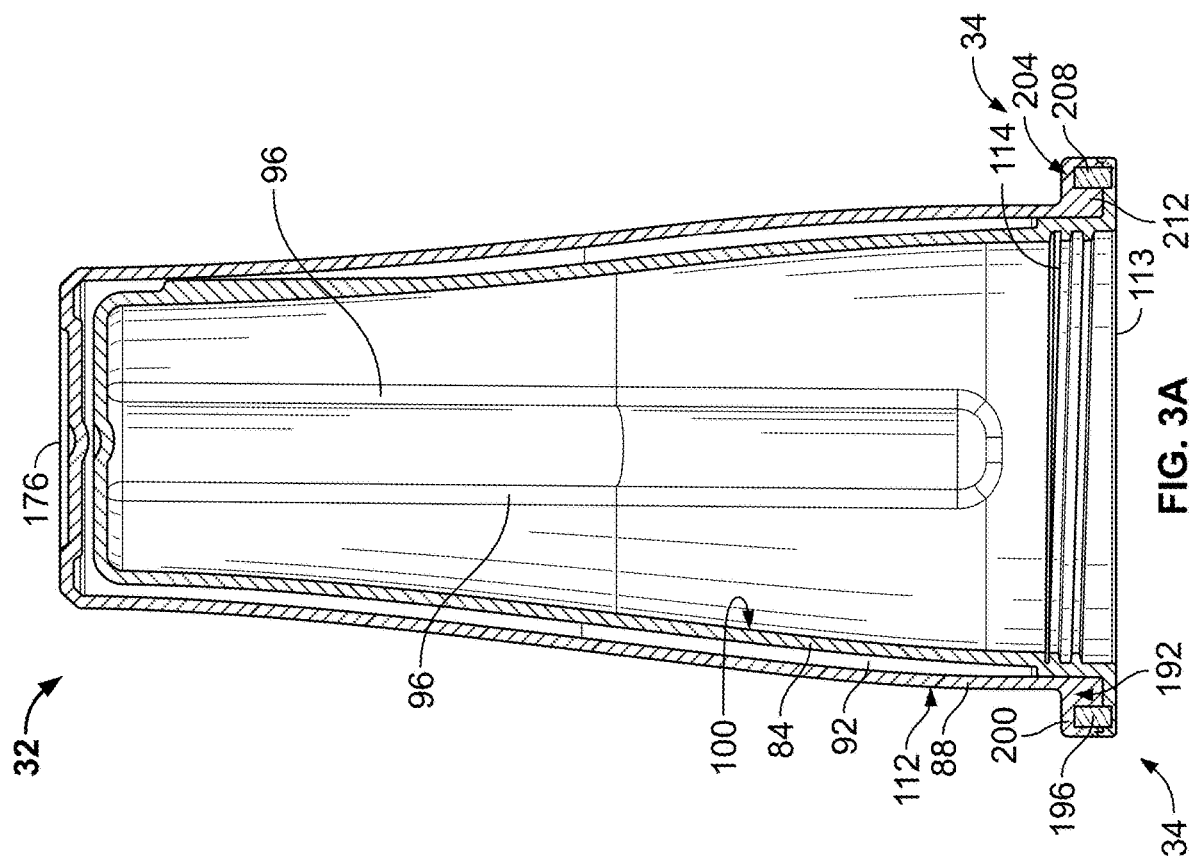

BLENDING SYSTEM WITH A LINER FOR BLENDING CONTAINER

CROSS-REFERENCE TO RELATED APPLICATION

This application is a continuation of U.S. patent application Ser. No. 15/817,608 filed on Nov. 20, 2017, entitled "BLENDING SYSTEM WITH A LINER FOR BLENDING CONTAINER," which claims priority to U.S. Provisional Patent Application No. 62/423,807 entitled "BLENDING SYSTEM WITH A LINER FOR BLENDING CONTAINER," filed on Nov. 18, 2016, each of which are incorporated herein by reference in their entireties.

FIELD OF THE INVENTION

The present disclosure generally relates to a sleeve or liner for a blending container. More particularly, this disclosure relates to an interchangeable sleeve for a blending container.

BACKGROUND

Blending systems are often used to blend and process foodstuffs. In recent years, personal blending systems have been developed with blending containers that are designed to serve a dual purpose and function as both a blending container and a drinking vessel. Typically, the container may include the foods for blending and then will connect at its top with a blade assembly. Once connected, the user may invert the container/blade assembly so that the container/blade assembly engages with the personal blending system base. A motor may be positioned within the base and activated to impart rotation to the blade assembly to blend the contents within the container. Once blending is completed, the user may remove the container/blade assembly from the base, invert it again, and remove the blade assembly from the container. The user can then directly drink from that container, or insert a top on the container for storage or transport.

The personal blending system may have an interface between the container and the blade assembly, such as a threaded connection with an O-ring. This interface may generally prevent liquid from leaking out of the container when attached to the blade assembly. That O-ring may generally create an air-tight seal between the two structures.

Additionally, the interface between the container, the blade assembly, and the base of the personal blending system may include an interlock feature to ensure that control of the motor is operational based on the interlocked attachment of the container and blade assembly to the base.

However, containers for those conventional personal blending systems have relatively small motors and thus, do not observe the potential pressure build-up in the container as would a blender with a high performance motor, such as a 2 HP motor. As a result, the use of a conventional sealing system with a high performance blender can create a large and unsafe pressure condition within the container.

Additionally, most users will only have a single conventional blend and go type personal blending system container. As such, they need to be washed often and this may be inconvenient for the user. These blend and go containers may include interlocks for proper operation of the motor, threads, magnets, or other interlock type features that may prevent them from being a preferred drinking vessel. However, there is a need to provide a container for personal blending systems that can be constructed of a disposable material or a thin material that may allow a user to store or transport the foodstuffs—especially one that provides a more traditional drinking vessel for the user.

SUMMARY

A blending system may include a base encasing a motor and a blade base in operative communication with the motor and selectively engaged with the base. The blade base may include an interior surface having a generally rectangular configuration, a blade positioned in proximity to the interior surface and operatively engaged with the motor, and an engagement member. The blade assembly may also include a container having a container engagement member selectively attached with the engagement member of the blade base. The container may include a liner and an outer sleeve such that the liner is removable from the sleeve after blending for storage, transport, or consumption of the product therein.

A blending system may include a base encasing a motor, a blade assembly in operative communication with the motor and selectively engaged with the base, and a container selectively engaged with the blade assembly. The blending system may also include a gasket positioned between the container and blade assembly, where the gasket is configured to create a seal between the blade assembly and container at a first pressure and to allow gas to exit between the container and blade assembly at a second pressure. The container may include a liner and an outer sleeve such that the liner is removable from the sleeve after blending for storage, transport, or consumption of the product therein.

A blender assembly for mixing a product in a container may include an inner liner for containing a product to be mixed therein and an outer sleeve for receiving the inner liner therein, the outer sleeve having an interlock feature. The inner liner may be made from a disposable material. The inner liner may include a radial bulbous portion that is configured to frictionally abut an inner surface of the outer sleeve. The inner liner may include a rim that defines an opening such that the rim is configured to abut against a blade base. The rim may be configured to abut against an open top end of a blade base. The outer sleeve may include at least one interlock tab configured to engage at least one recessed portion of a blender base for toggled control of a blender motor. The inner liner may include a size of at least one of 8, 12, and 16 fluid ounces and the outer sleeve may be configured to receive the inner liner that includes a size of 8, 12, and 16 fluid ounces.

A blending container for retaining foodstuff to be blended by a blender, the blending container may include an outer sleeve having an inner surface and at least one interlock tab extending therefrom. An inner liner having a wall that extends from a perimeter of a bottom to define a cavity to retain the foodstuff to be blended, wherein at least a portion of the wall of the inner liner frictionally engages against a portion of the inner surface of the outer sleeve.

A method of mixing a product within a container, the steps may include inserting an inner liner into an outer sleeve and inserting foodstuff to be blended into the inner liner. A blade base may engage the inner liner and the outer sleeve. The blade base and outer sleeve may attach to a blender base for selectively blending the foodstuff therein.

Described herein is a blending container for mixing a product with a blender base, the blending container comprising an inner liner for containing a product to be mixed therein; and an outer sleeve for receiving the inner liner therein, the outer sleeve having an interlock feature. The inner liner may be made from a disposable material. The inner liner may include a radial bulbous portion that is configured to frictionally abut an inner surface of the outer sleeve. The inner surface of the outer sleeve comprises may comprise an annular shoulder extending into an inner cavity. A wall of the inner liner may operatively mate with the annular shoulder. The inner liner may be operatively removable from the outer sleeve. The inner liner includes a rim that defines an opening and operatively abutting against a blade base. The rim may be configured to abut against an open top end of a blade base. The outer sleeve includes at least one interlock tab configured to engage at least one recessed portion of a blender base for toggled control of a blender motor. The inner liner includes a size of at least one of 8, 12, and 16 fluid ounces. The outer sleeve is configured to receive the inner liner that includes a size of 8 fluid ounces, 12 fluid ounces, and 16 fluid ounces.

A blending container for retaining foodstuff to be blended by a blender, the blending container comprising a blender base comprising a motor, a blade base, a container operatively coupled to the blade base. The container may comprise an outer sleeve having an inner surface and at least one interlock tab extending therefrom, and an inner liner having a wall that extends from a perimeter of a bottom, the wall defines a cavity to retain the foodstuff to be blended, wherein at least a portion of the wall of the inner liner frictionally engages against a portion of the inner surface of the outer sleeve. The inner liner and outer sleeve may not be coupled through other mechanisms. In other instances, the inner liner may be operatively threadedly engaged with the outer sleeve. The blade base may comprise at least one recess operatively receiving the at least one tab. The inner liner may comprise a disposable material and the outer liner comprises a different material and is non-disposable. The inner liner may comprise a release mechanism that includes at least one of a handle attached with the inner liner, a push button on the outer sleeve, an aperture positioned on the outer sleeve sized to permit access to the inner liner to disengage the inner liner from the outer sleeve, or a tab on the inner liner.

A method of mixing a product within a container, the steps comprising: inserting an inner liner into an outer sleeve; inserting foodstuff to be blended into the inner liner; engaging a blade base to the inner liner and the outer sleeve; and attaching the blade base and outer sleeve to a blender base for selectively blending the foodstuff therein. The method may further comprise removing said inner liner from the outer sleeve. The method may further comprise inserting an other inner liner into the outer sleeve.

BRIEF DESCRIPTION OF THE DRAWINGS

The present teachings may be better understood by reference to the following detailed description taken in connection with the following illustrations, wherein:

FIG. 3A is a first cross-sectional view of a blending cup;

FIG. 3B is a second cross-sectional view of the blending cup;

DETAILED DESCRIPTION

Figure 1:
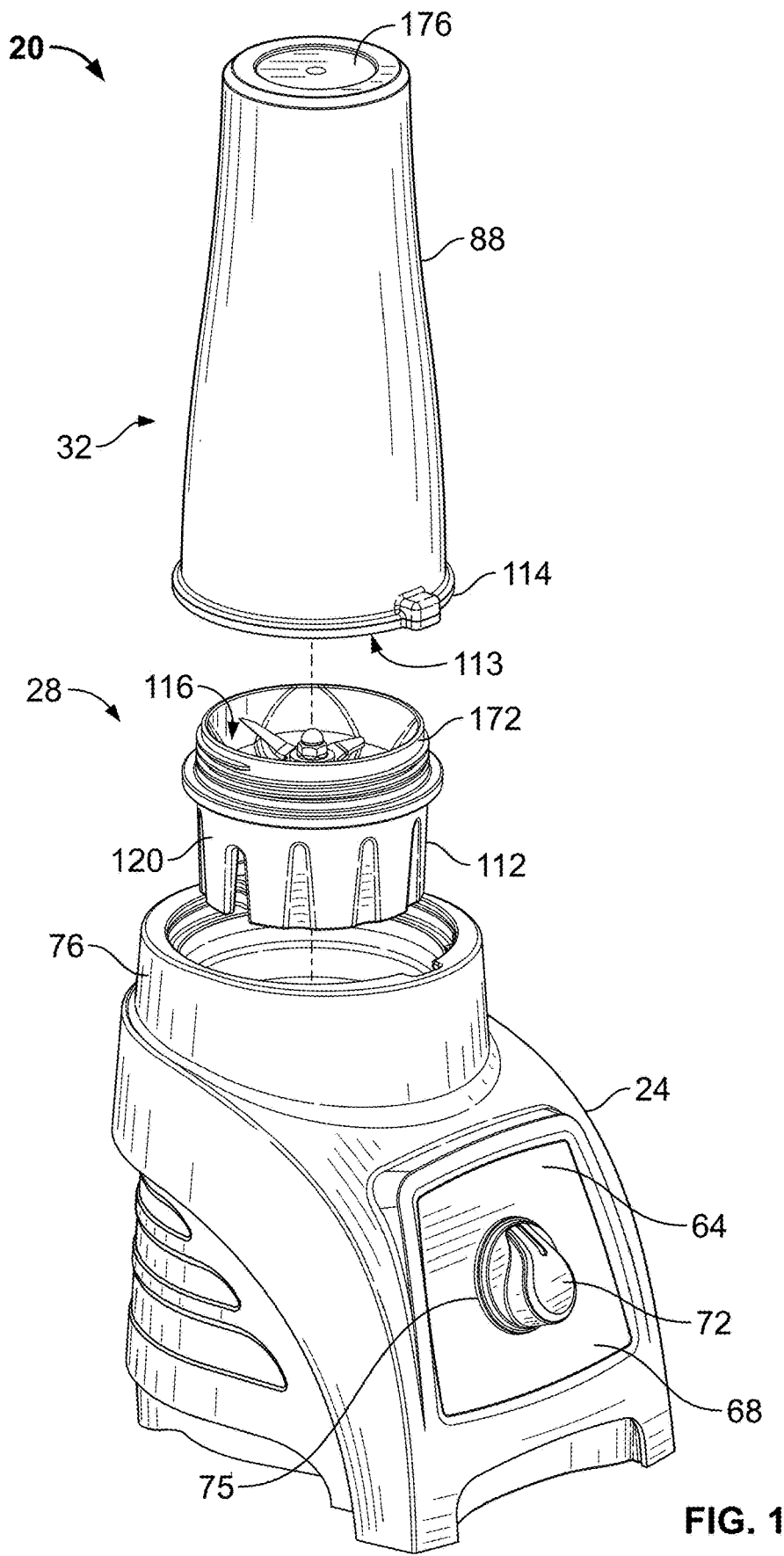
FIG. 1 is a perspective view of a blender system with a blending container.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, and the like. As such, references to a blender, blending system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. Foodstuff may be added to the blending container. Furthermore, while blending of "ingredients," "contents" or "foodstuff" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In some traditional blending systems, foodstuff is placed into a blending container for blending. After blending, a user may remove the blended product from the blending container. In an aspect, the user typically either pours the content out of the blending container and into another container or consumes the product directly from the blending container. In either case, the blending container will have remnants therein after consumption. This typically requires the user to clean the blending container. In other instances, the user may throw out the blending container (e.g., such as when the blending container is disposable.

A blending system 20 of the present teachings is shown in FIG. 1. The blending system 20 may include a blender base 24, a blade base 28 and at least one blending container 32 of appropriate configurations. The blade base 28 may be selectively and operatively coupled with the blender base 24 and the blending container 32 as described in more detail below. The blending system 20 may include an interlock feature 34 that may generally prevent operation of the blending system when and if the blending container and blade base 28 become disengaged as described in more detail below. The blending system 20 may have a smaller configuration than traditional blending systems. The blending system 20 may have a smaller footprint and smaller profile than traditional blending systems. The blending system 20 may be considered a personal or individual blending system. However, it should be understood that the present teachings are not limited to personal blending systems. The present teachings may apply to any appropriate blending system.

Figure 2:
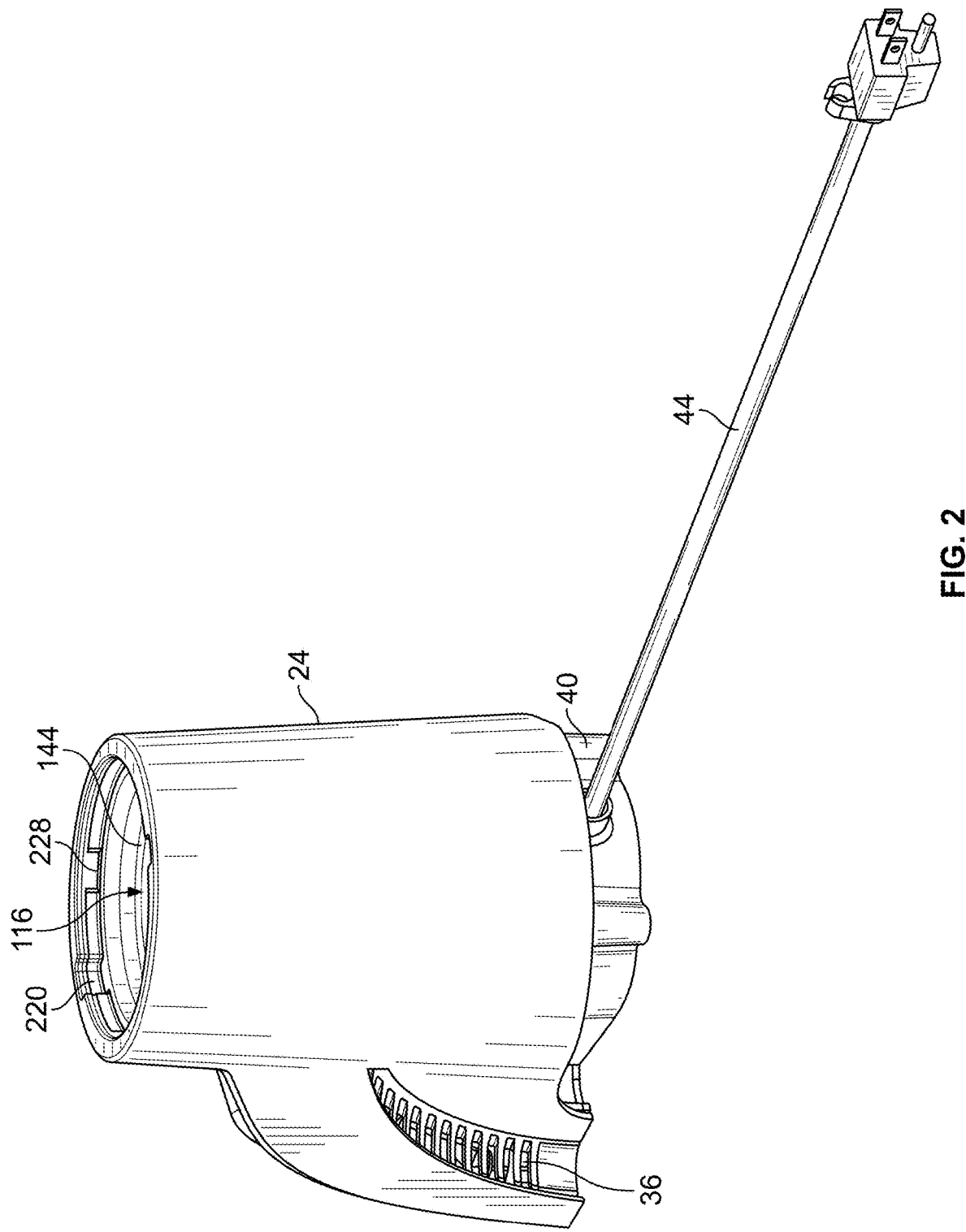
FIG. 2 is a perspective view of a blender base of the blender system.

As shown in FIG. 2, the blender base 24 may be any appropriate size and configuration. The blender base 24 may be of a configuration to house and generally protect the operative components of the blending system 20. The blender base 24 may house a high performance motor, gearing, sound damping components, and fan (all not shown). These operative components may be of any appropriate configuration—the present teachings are not limited to any specific configuration.

The blender base 24 may include vents 36 of any appropriate configuration. The vents 36 facilitate exhaustion of air generated within the blender base 24.

The motor 40 may be in operative communication with a power cord 44 configured to operatively communicate with a power supply source to provide the appropriate power to operate the blending system 20. The power cord 44 may be of any appropriate configuration—the present teachings are not limited to the configurations shown and described herein.

As shown in FIG. 1, the blender base 24 may include a control panel 64 positioned on a face 68 of the blender base 24. The control panel 64 may be of any appropriate configuration and may be utilized to set the operative condition of the blending system 20 by the user. By way of a non-limiting example, the control panel 64 may include a knob 72 to selectively adjust settings of the blending system 20, including, without limitation setting rotational speed of the blade base 28 during operation of the blending system 20. The knob 72 can also be used to reset the system, turn the system on/off, select preprogrammed functions, and/or select a pulse function. It will be appreciated that the control panel 64 may further include alternative or additional input devices, such as buttons and switches, and other feedback and readout devices, such as an LCD or LED display.

The blender base 24 may include a pedestal 76 at a top portion of the blender base 24. The pedestal 76 may be of any appropriate shape and size and can be materially integral with the blender base 24. By way of a non-limiting example, the pedestal 76 may be sized and shaped to cooperate with the blade base 28 as described in more detail below. The pedestal 76 may be of a shape such that an interior of the pedestal 76 corresponds with the external shape of the blade base 28. In the present example, the interior shape of the pedestal 76 and the external shape of the blade base 28 are generally circular.

The blending system 20 includes a first blending container 32 that may be of any appropriate configuration shape and size. The first blending container 32 may be of a configuration to act as a single serve container, i.e., it is a smaller size than a standard blender. The first blending container 32 may also be of a configuration to act as a drinking vessel. The first blending container 32 may be a variety of sizes, including, but not limited to, a 20 oz., 24 oz., 32 oz., or a 40 oz. size.

The first blending container 32 may be a double-walled container having an inner layer 84 and an outer layer 88 spaced from the inner layer 84. A space 92 may be formed between the inner and outer layers 84, 88. The space 92 may provide an insulative feature to the first blending container 32, i.e., it may help the contents thereof remain cool or warm, as applicable. Further, the first blending container 32 may include elongated ribs 96 projecting from an interior side 100 of the inner layer 84 into a blending are of the first blending container 32. The ribs 96 may comprise one or more protrusions generally spanning a length of the blending container 32. In the present example, there are two ribs spaced at opposing sides of the first blending container 32. The ribs 96 may be configured to aid in agitating the contents of the first blending container 32 during blending.

The first blending container 32 also includes a plurality of fins 97 positioned between an outer wall of the inner layer 84 and an inner wall of the outer layer 88. One or more fins 97 can project outwardly from the outer wall of the inner layer 84 or alternatively or additionally, one or more fins 97 can project inwardly from the inner wall of the outer layer 88.

The first blending container 32 may include an open end 113 through which material may be inserted in advance of blending or may exit after blending. The open end 113 may be of any appropriate configuration and size. The open end 113 may be of a configuration to permit a user to drink directly therefrom. This may result in the first blending container 32 being capable of utilization as a drinking vessel. The first blending container 32 may include an engaging portion 114 configured to operatively and selectively engage with the blade base 28. The engaging portion 114 may be of any appropriate configuration and type, including, without limitation being a threaded portion, a bayonet engaging member, or the like. Regardless of the configuration of the engaging portion 114, when secured to the threaded portion 172 of the blade base 28, additional blending space is created between an interior portion of the blade base 28 and the open end 113 of the first blending container 32, as will be described in greater detail herein.

Figure 4:
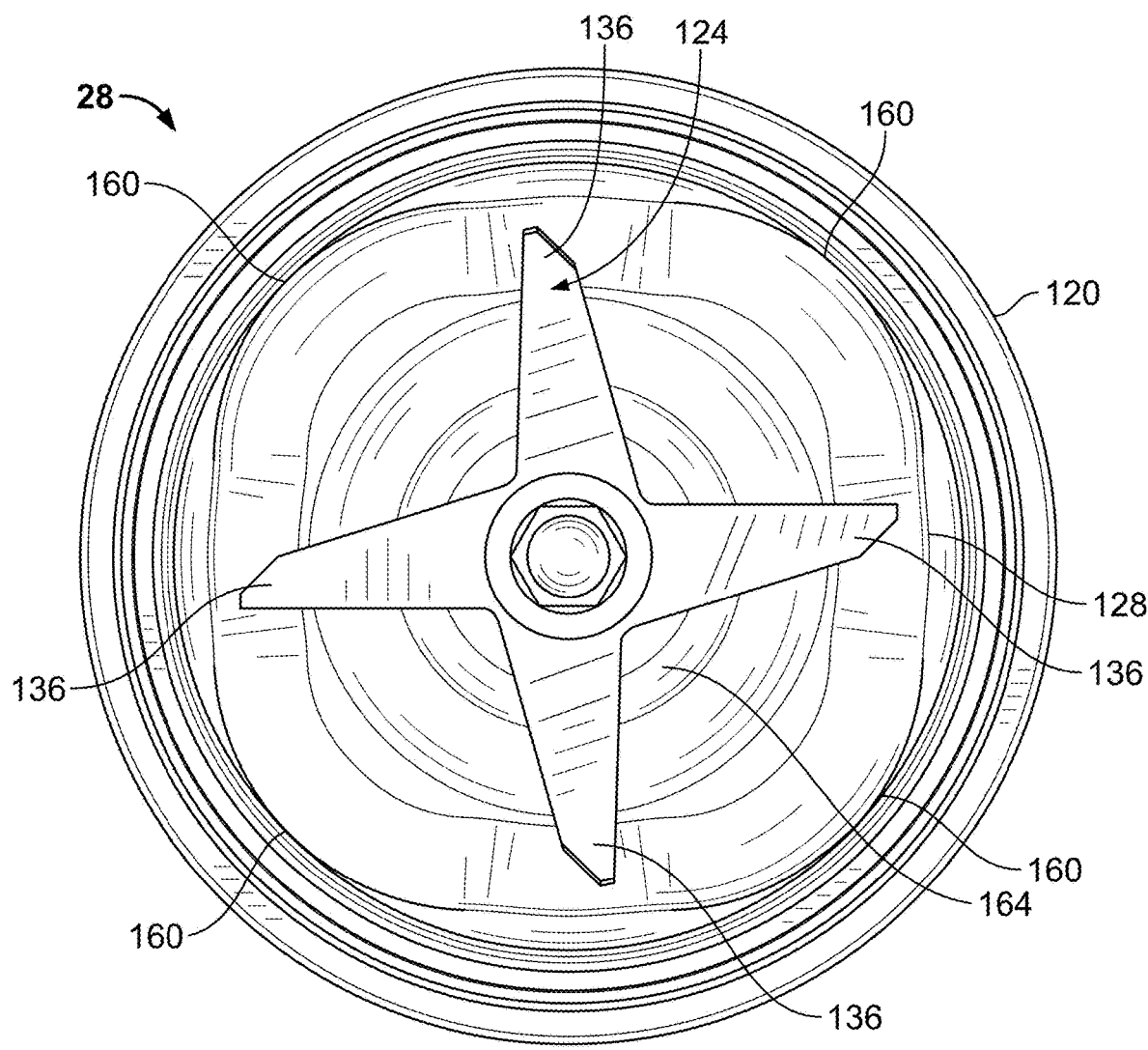
FIG. 4 is a plan view of an embodiment of a blade base.
Figure 5:
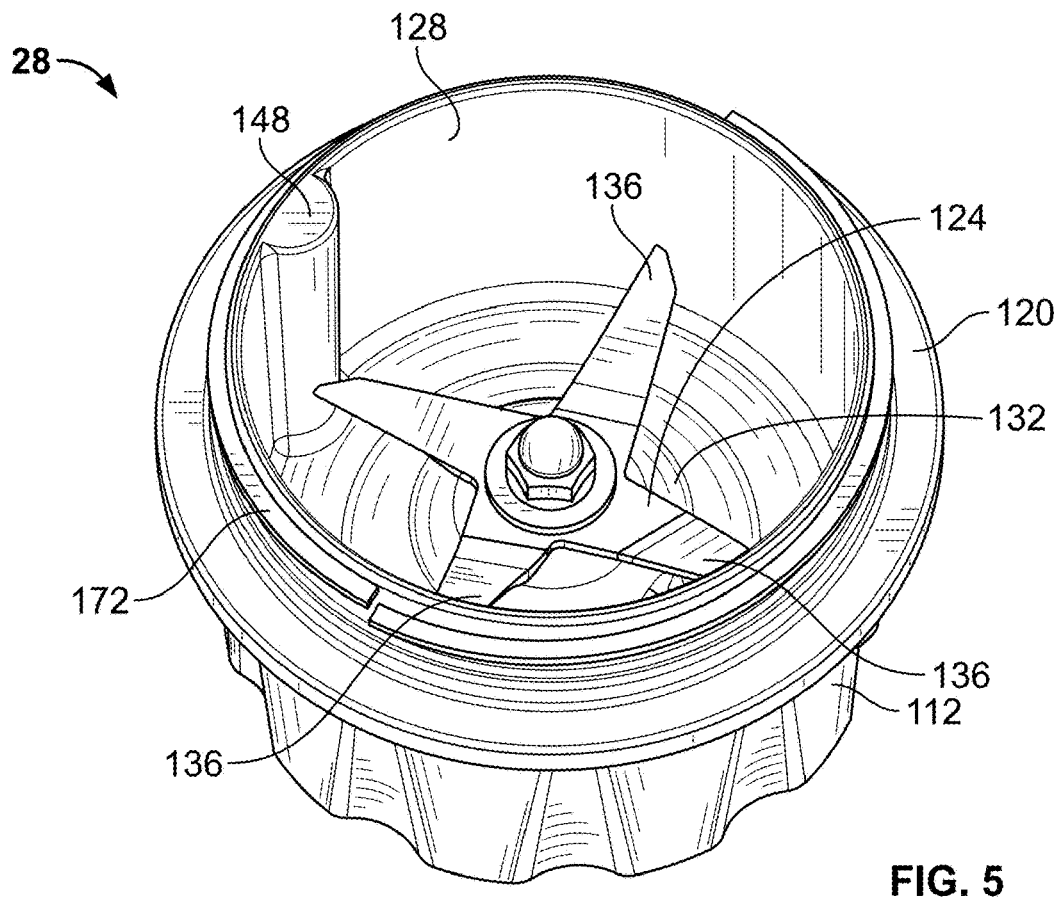
FIG. 5 is a perspective view of an embodiment of a blade base.
Figure 6:
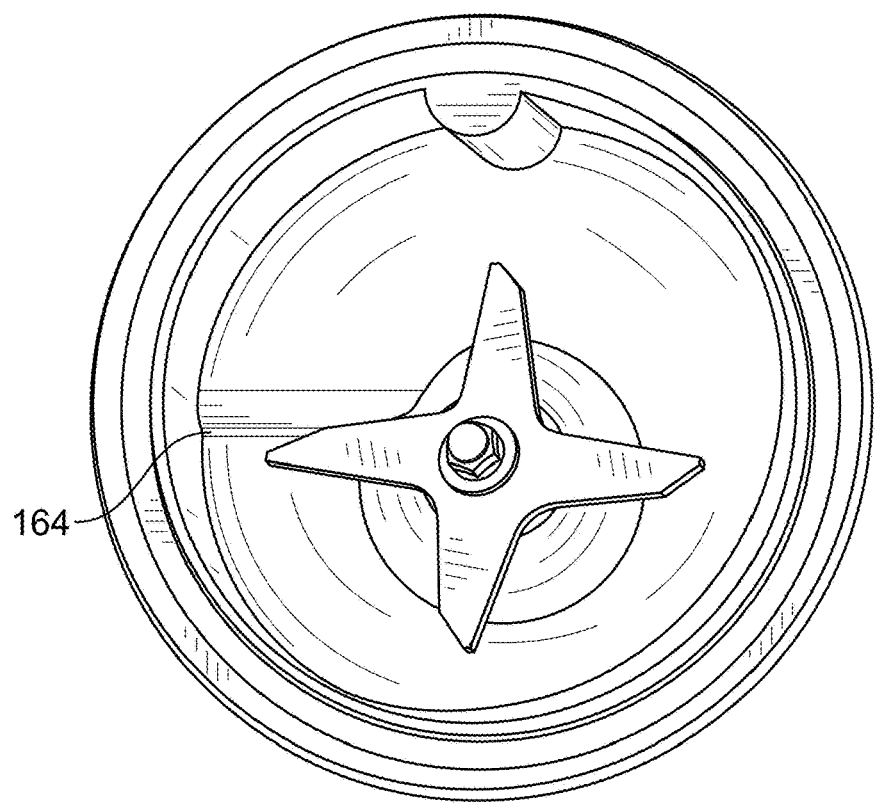
FIG. 6 is a plan view of an embodiment of a blade base.
Figure 7:
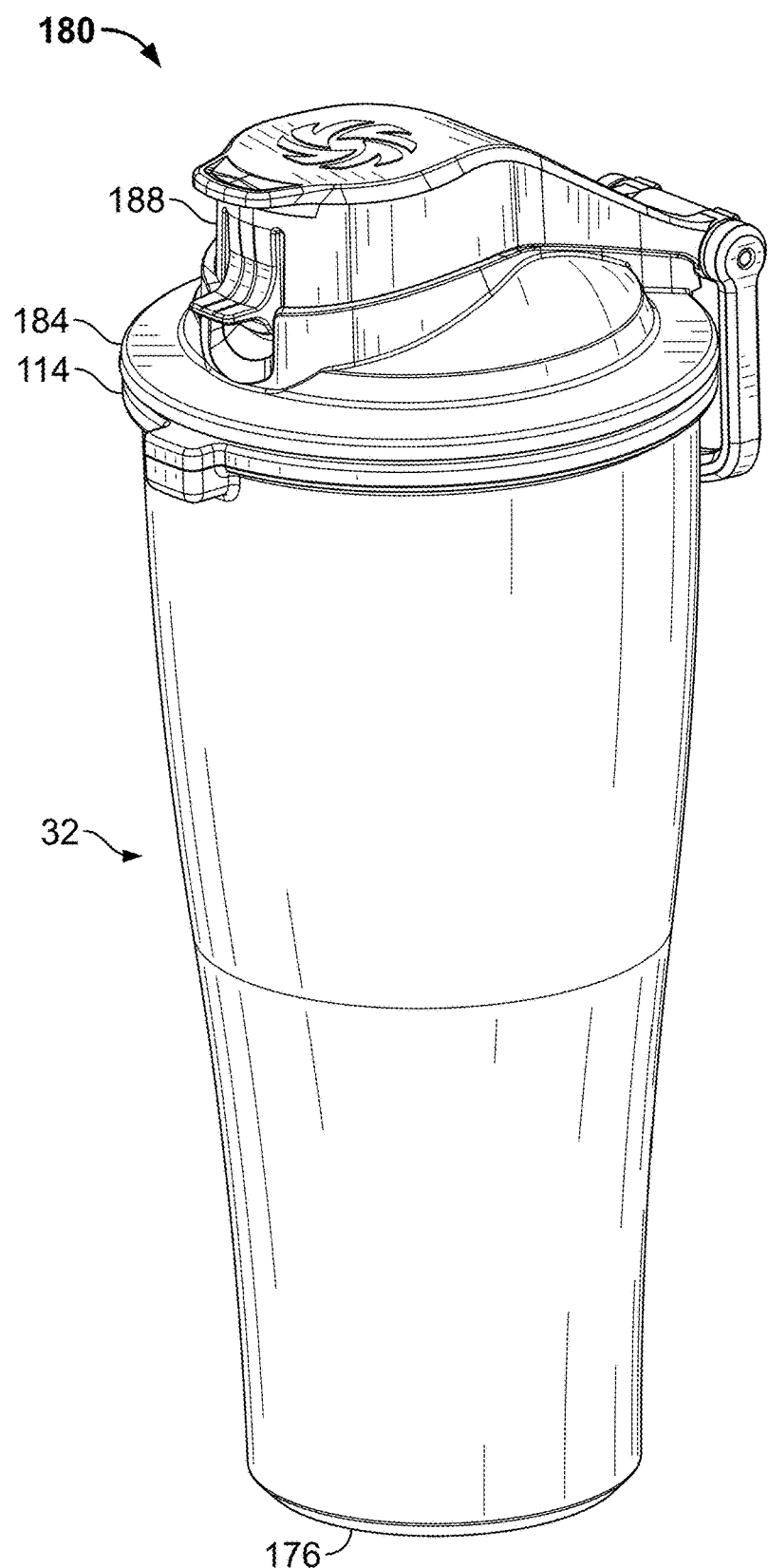
FIG. 7 is a perspective view of a blending container with a lid.
Figure 8:
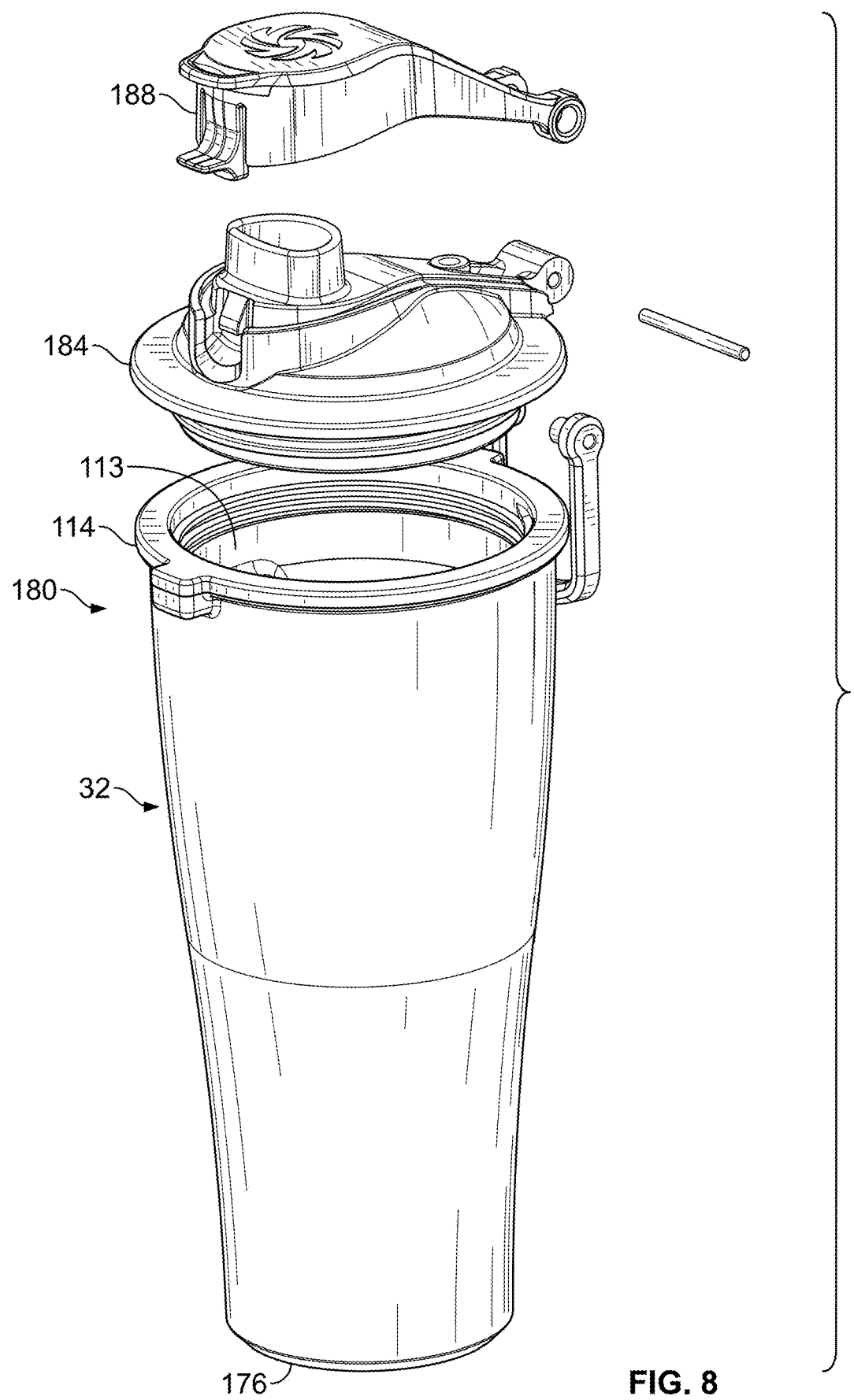
FIG. 8 is an exploded view of a blending container and lid.
Figure 9:
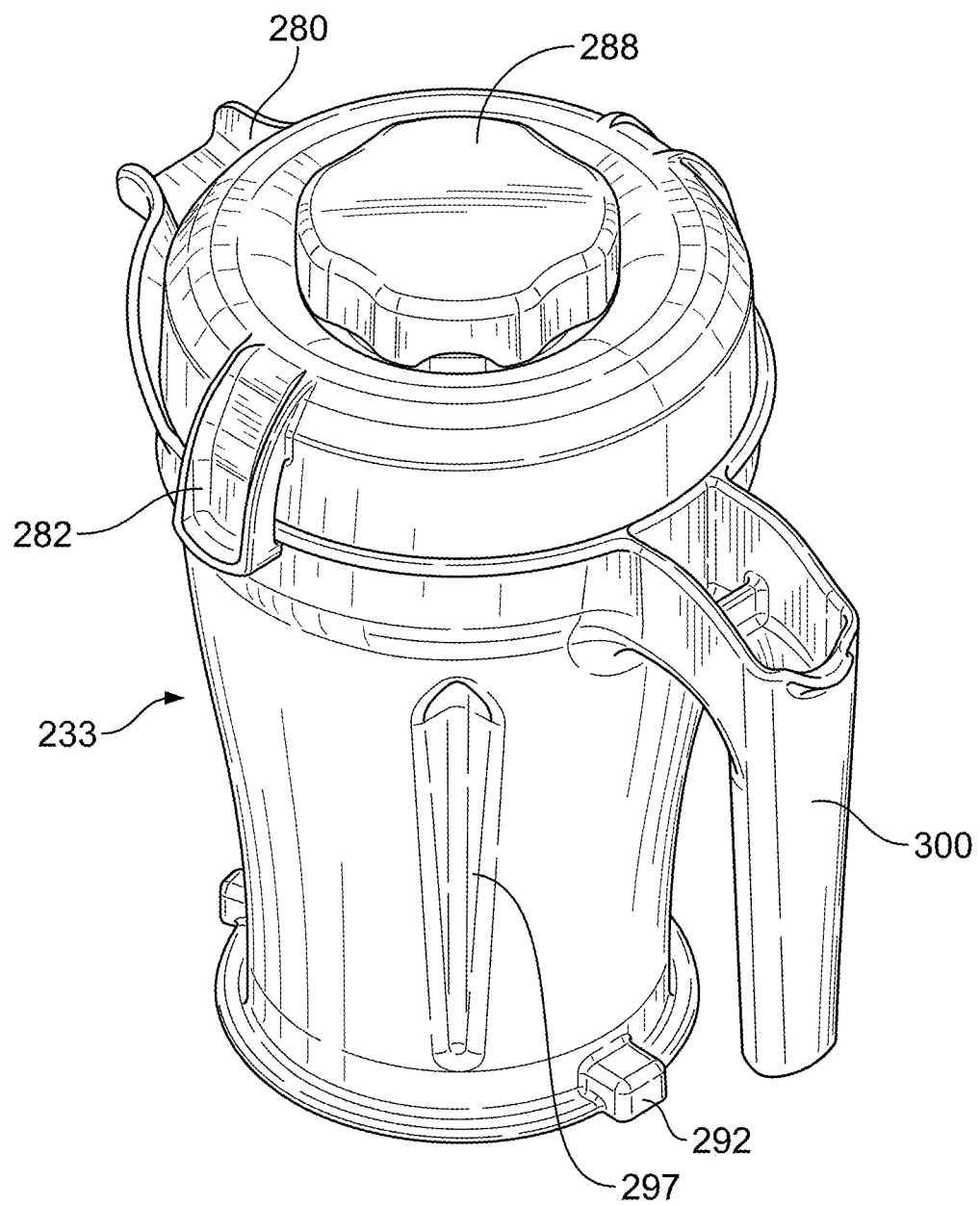
FIG. 9 is a perspective view of an embodiment of a blender container.

FIGS. 5 and 6 illustrate two different embodiments of the blade base 28. Each embodiment of the blade base 28 may be sized and shaped to operatively fit within an opening 116 in the pedestal 76 in any appropriate manner. The blade base 28 may include a housing 120 having a first side and a second side. A blade 124 is positioned within the first side of the housing 120. The housing 120 may be of any appropriate configuration. As shown in FIG. 4, the housing 120 may include a rectangular inner wall 128 wherein the corners are used for agitating the contents of the attached blender container, as will be described herein. Alternatively, as shown in FIG. 6, the housing 120 may include a generally circular inner wall 128 with one or more projections used for agitation. The blade 124 may be connected to the housing 120 in any appropriate manner. The blade 124 may be of any appropriate configuration, type and size. The present teachings are not limited to the configuration shown and described. By way of a non-limiting example, the blade 124 can be of a conventional blender blade configuration and, as such, includes a plurality of radially extending blades 136 that are carried by, and positioned above a bottom surface of the blender base 28 by a vertically oriented blade shaft. The blade shaft extends downwardly through a hub to the second side of the blender base 28. A spline is secured to the end of the blade shaft on the second side of the blender base 28. The spline of the blade shaft engages with a splined coupler positioned within the pedestal, the splined coupler being connected to a motor shaft. Accordingly, when the blade base 28 is positioned within the pedestal 76, rotation of the motor shaft caused by actuation of the motor is thereby transferred to the blades, which are rotatably positioned within the blade base.

As mentioned above, the blade base 28 may include features to agitate the flow of material with the blender container 32. For example, the blade base 28 may break up flow of material within the blender container 32 during operation of the blending system 20. In the embodiment shown in FIG. 5, the blade base 28 may include a protrusion 148 on the inner wall 128 of the housing 120. The protrusion 148 may be of any appropriate shape and size. By way of a non-limiting example, the protrusion 148 may be a protrusion 148 extending from the inner wall 128. The protrusion 148 may be any appropriate shape, such as generally rounded. The protrusion 148 may be monolithically formed with the inner wall 128 or may be attached through a subsequent operation. The protrusion 148 may be approximately ½ inch in diameter. The protrusion 148 may extend from a length of the blade base 28 from the bottom wall 132 to an open top end 152. It will be appreciated that the blade base 28 may include more than one protrusion 148. The blade base 28 may also include an agitator 164 positioned on the bottom wall 132. The agitator 164 may be of any appropriate configuration and is not limited to that shown and described. Further, any appropriate number of agitators 164 may be utilized, e.g., one, two, three, etc. In some embodiments, the blade base 28 may not include an agitator 164. The agitator 164 may include a ramped surface formed in the bottom wall 132. The ramped surface may be of any appropriate configuration, including, without limitation being a helical ramp formed with the bottom wall 132. The agitator 164 may be monolithically formed with the bottom wall 132 or may be attached through a subsequent operation. The agitator 164 may form a ledge 168 in the bottom wall 132, which may be utilized to disrupt the flow pattern of the material during use of the blending system 20. The blade base 28 may include one or more agitator 164; the present teachings are not limited to that shown. Further, the bottom wall 132 may not include an agitator 164.

In addition or alternatively, as shown in FIG. 4, the inner wall 128 of the blade base 28 may be of a shape to agitate the flow of material within the blending container 32 during operation thereof. In these embodiments, the base 132 may have a generally rectangular shape such as a generally square shape The engagement between the blade base 28 and the first and/or second blending container is such that corners 160 of the square-shaped inner wall 128 align with the ribs 96 formed within the inner wall of the container. The alignment of the corners 160 and the ribs 96 increases the agitation of the material in the container during the blending operation, thereby improving the blend quality and enhancing the blender performance. Once aligned, the user can also visually confirm that the blade base 28 is operatively secured with the blending container 32.

The blade base 28 may include an engaging portion 172 configured to operatively and selectively secure with the engaging portion 114 of the blending container 32. The engaging portion 172 may be of any appropriate configuration. By way of a non-limiting example, the engaging portion 172 may be a threaded portion 172 configured to mate with the threaded portion 114 of the container portion 32. In these embodiments, the threaded portion 114 of the container portion 32 may be generally circular and the threaded portion 172 of the blade base 28 may correspondingly circular in shape. As described above, the first blending container 32 may be configured as a drinking vessel. In these embodiments, the first blending container 32 is able to easily convert from a blending container to a drinking vessel. For example, in addition to the open end 113 noted above, the first blending container 32 may include a closed end 176 generally opposite the open end 113. When the first blending container 32 is operatively secured to the blade base 28, the housing 120 of the blade base 28 is configured such that the housing 120 may create additional blending space for the material to be blended. As an example, the location of the blade 124 within the housing 120 may be generally cup-shaped, which may provide this additional blending space. When removed from the blade base 28, the first blending container 32 may function as a drinking vessel. In some embodiments, the first blending container 32 may include a lid assembly 180 that is selectively engageable with the open end 113 of the first blending container 32. The lid assembly 180 may be of any appropriate configuration. For example, the lid assembly 180 may include a base member 184 that may be selectively engageable with the open end 113 in any appropriate manner, including, without limitation via a snap-fit, a threaded engagement, or any appropriate means. The lid assembly 180 may further include a cap 188 that may be selectively positionable relative the base member 184. The cap 188 may be positionable to and from open and closed positions. In the open position, the cap 188 may allow contents within the blending container 32 to be expelled therefrom. In the closed position, the cap 188 may generally prevent contents of the blending container 32 to be expelled. Further, in the closed position, the cap 188 may be engaged with the base member 184 to create a generally liquid tight seal such that regardless of the position of the blending container 32 the contents within the blending container will not be expelled therefrom. In this closed position, the blending container 32 may be utilized during travel or otherwise in storage of the contents therein.

Alternatively or in addition, the blending system 20 may include a second blending container 233 of a different configuration that the first blending container 233, such as being a larger size than the first blending container 32, e.g., the second blending container 233 may have a volume of 40 oz. The second blending container 233 may include at least one spout 280. Alternatively or in addition, the second blending container 233 may have at second spout 282. The second blending container 233 also may include at least one handle 300 for ease of use. The second blending container 233 may be vented to allow hot liquids to vent during operation of the blending system 20. A tamper or other apparatus may be used to agitate the contents of the second blending container 233, such as know in the art.

The first blending container 32 may be a double-walled container having an inner layer 84 and an outer layer 88 spaced from the inner layer 84. A space 92 may be formed between the inner and outer layers 84, 88. The space 92 may provide an insulative feature to the first blending container 32, i.e., it may help the contents thereof remain cool or warm, as applicable. Further, the first blending container 32 may include elongated ribs 96 projecting from an interior side 100 of the inner layer 84 into a blending are of the first blending container 32. The ribs 96 may comprise one or more protrusions generally spanning a length of the blending container 32. In the present example, there are two ribs spaced at opposing sides of the first blending container 32. The ribs 96 may be configured to aid in agitating the contents of the first blending container 32 during blending.

As described above, the blending container 32 and blade base 28 may include the interlock feature 34. The interlock feature 34 may be of any appropriate configuration to generally prevent access to the blade 124 when it is spinning. As shown in FIG. 3A, for example, the blending container 32 may include a first tab 192 extending therefrom. As shown in FIG. 3A, the first tab 192 may include a magnet 196 embedded therein. The at least one magnet 196 may be secured with the blending container 32 in any appropriate manner. By way of a non-limiting example, the magnet 196 may be welded into a pocket 200 formed in the blending container 32 between the inner layer 84 and the outer layer 88. In a further non-limiting example, the magnet 196 may be adhered, such as through use of an adhesive, between the inner layer 84 and the outer layer 88 of the blending container 32.

Further, as shown, the blending container 32 may include a second tab 204 extending therefrom. The second tab 204 may be of a similar configuration as the first tab 192, but may be of a different size. Further, the second tab 204 may be offset from the first tab 192 along the circumference of the blending container 32 at an angle that is not 180 degrees. In other words, the first tab 192 and second tab 204 are not aligned with one another, as described in more detail below. The second tab 204 may include a second magnet 208 embedded therein. The second magnet 208 may be welded into a second pocket 212 formed in the blending container 32 between the inner layer 84 and the outer layer 88. In a further non-limiting example, the second magnet 208 may be adhered, such as through use of an adhesive, between the inner layer 84 and the outer layer 88 of the blending container 32. While the first tab 192 and second tab 204 with the magnet 196 and second magnet 208 are shown and described, any number of tabs and magnets may be used without departing from the present teachings. Further still, the number of tabs and magnets utilized are not limited to that shown. Any appropriate number of tabs and magnets may be utilized, e.g., three, four, etc.

In these embodiments, the first magnet 196 and second magnet 208 may be positioned in the tabs 192 and 204, respectively. Once inserted therein, the inner and outer layers 84, 88 may be sonic welded together. Once sonic welded, the magnets 196 and 208 are melted into the tabs 192 and 204 capturing the magnets 196 and 208 between the inner and outer layers 84, 88.

Figure 13:
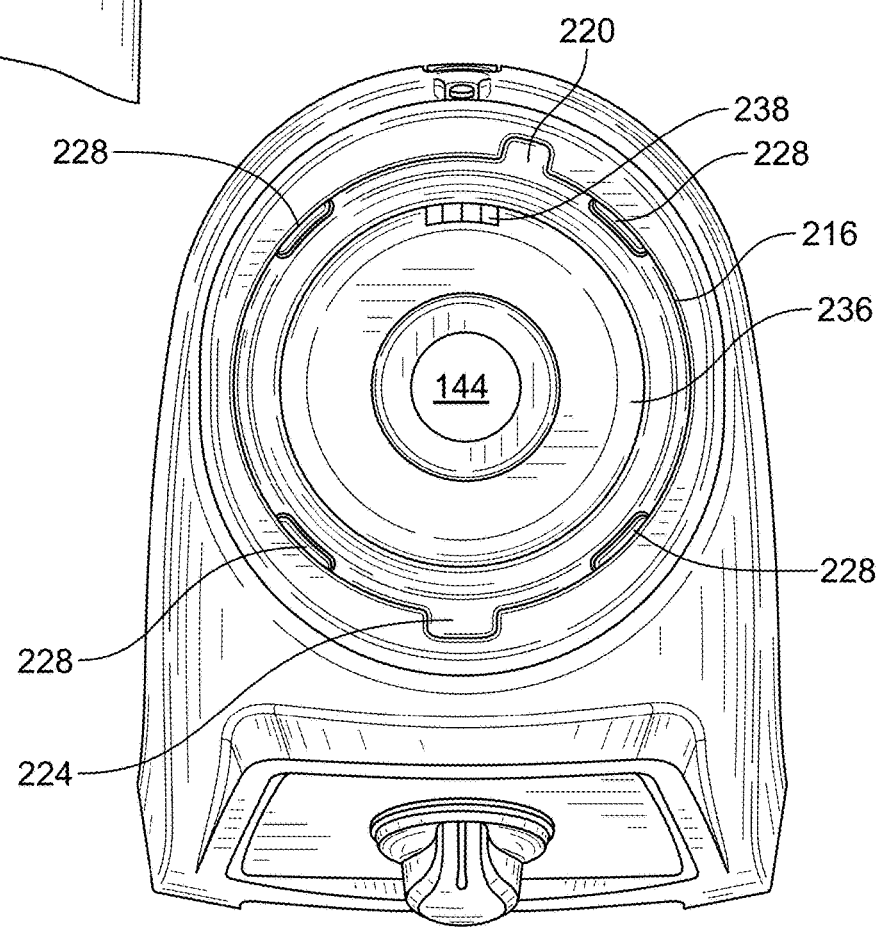
FIG. 13 is a plan view of a blender base.

As shown in FIG. 13, the blender base 24 may include a lip 216 in the opening 116 in the pedestal 76; the lip 216 may generally encompass a majority portion or all of the opening 116. The lip 216 may include first and second recessed portions 220, 224. The first and second recessed portions 220, 224 may be configured such that the tab 192 and second tab 204 are selectively and operatively engageable with such first and second recessed portions 220, 224. The first recessed portion 220 may be shaped and sized such that only the first tab 192 may be capable of operatively engaging it. Similarly, the second recessed portion 224 may be shaped and sized such that only the second tab 204 is operatively engageable therewith. This configuration may help align the blending container 32 and blade base 28 with the blender base 24. As noted above regarding the relative positions of the tab 192 and second tab 204, the first and second recessed portions 220, 224 may be offset from one another such that they are not aligned at 180 degrees with respect to one another.

Further each of the first and second recessed portions 220, 224 may include a sensor, such as a reed switch (not shown) in its proximity. The reed switch may be utilized to indicate when both of the tab 192 and second tab 204 are operatively positioned within the first and second recesses 220, 224. Contacts of the reed switch may be in normally open position when the magnets 196 and 208 are not in proximity thereto, i.e., when the tabs 192 and 204 are not positioned in the first and second recessed portions 220, 224. When the magnets 196 and 208 within the tabs 192, 204, respectively, are moved in operative proximity to the reed switch, the reed switch will close, i.e., the reed switch will close when a magnetic field is present. Once the magnets 196 and 208 are moved away from the switch, the reed switch will go back to its original open position.

When the reed switch is in the open position, the motor 40 is configured to be disabled, i.e., not operate. When the motor 40 is disabled, the blade base 28 and more particularly, the blade 124 is not capable of operation. Therefore, in order to operate the blending system 20, the blending container 32 and blade base 28 must be operatively coupled with the blender base 24. Specifically, the tabs 192 and 208 must be operatively positioned within the first and second recessed portions 220, 224, respectively in order for the blending system 20 to operate. This generally prevents the user from being able to access or otherwise contact the blade 124.

The aforementioned interlock feature 34 is further configured to generally prevent circumvention by a user. For example, the reed switch may be calibrated to disengage or disable the motor 40 anytime the magnet 196 or second magnet 208 or both are a predetermined distance away from the reed switch. The predetermined distance may be calibrated so that the user may not create enough space between the blending container 32, blade base 28 or blender base 24 to access the blade 124.

While the blending system 20 is operating, i.e., the motor 40 is operating, the blending system 20 tends to attempt to rotate the blending container 32 relative to the blender base 24. The tabs 192 and 204 being engaged with the first and second recessed portions 220, 224, respectively may prevent the blending container 32 from rotating—it may maintain the blending container 32 in its operative position with respect to the blender base 24. The tabs 192 and 204 may be generally rectangular in shape. Further, the corresponding first and second recessed portions 220, 224 may be of a corresponding rectangular shape. The rectangular shape may provide the anti-rotation feature generally keeping the interlock feature 34 operatively aligned.

Figure 10:
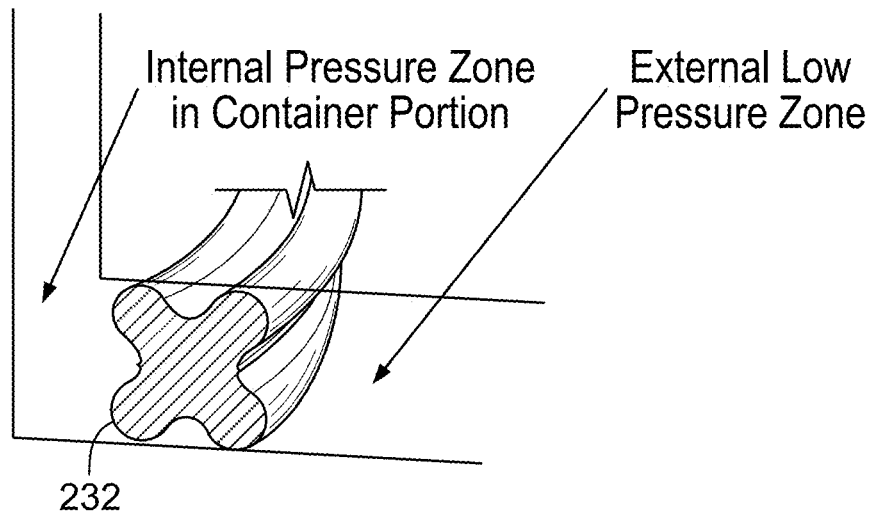
FIG. 10 is a cross-sectional view of a gasket of a blender system.
Figure 11:
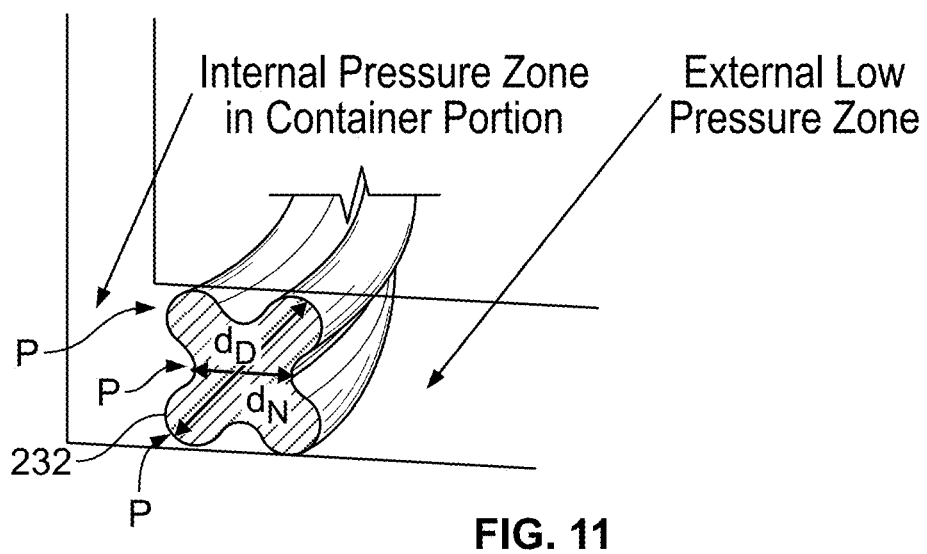
FIG. 11 is a cross-sectional view of a gasket of a blender system.

The blade base 28 may further include a gasket 232 configured to provide a seal between the blade base 28 and blending container 32 when coupled together. The gasket 232 may have a generally X-shaped cross section, such as shown in FIG. 10. The gasket 232 may generally span the periphery of the blade base 28 such that when the blade base 28 and blending container 32 are coupled—such as being threaded together—the gasket 232 is positioned along the entirety of a location of engagement between the blade base 28 and blending container. While the gasket 232 is shown as having a generally X-shaped cross-section, it will be appreciated that the gasket 232 may have any appropriate cross-sectional shape that performs the same function described below. By way of a non-limiting example, the gasket 232 may have a diameter of a narrow portion $d_N$ that is shorter than a diameter of a distended portion $d_D$, such as shown in FIG. 11. The gasket 232 may be formed of any appropriate material, including, but not limited to, polymeric materials such as elastomers or rubbers including thermoplastic or thermoset elastomers, rubber-based materials, and other polymers and co-polymers having properties consistent with the features described above.

Figure 12:
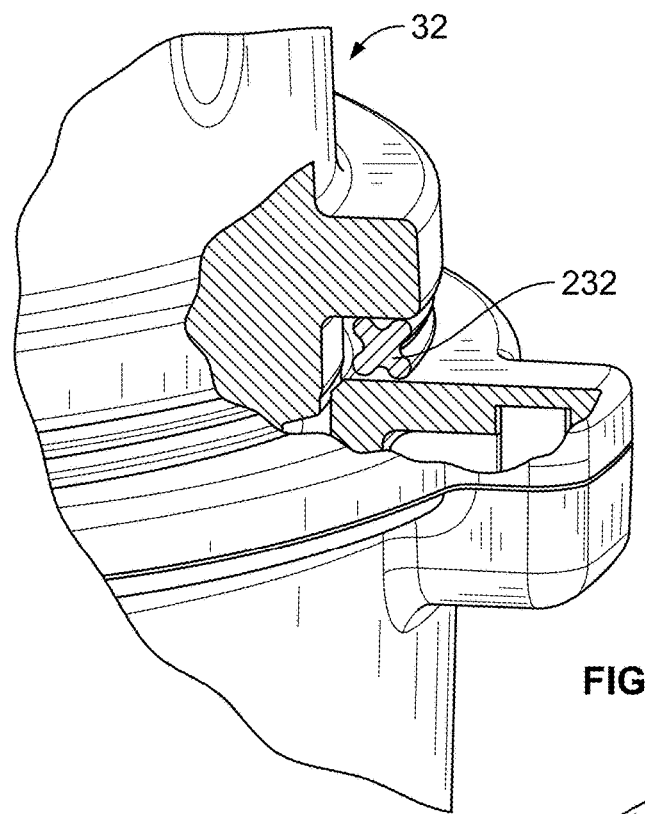
FIG. 12 is a cross-sectional view of a gasket on a blending system.

The gasket 232 may be configured to seal at low pressures and allow gas to exit at pressures that exceed a predetermined pressure within the blending container 32 during operation of the blending system 20. For example, the gasket 232 may function as a seal when the internal pressure zone within the blending container 32 exists from zero pressure to the predetermined level of pressure. After the internal pressure zone within the blending container 32 exceeds the predetermined level pressure—this may be considered a high pressure condition—the configuration of the gasket 232 may displace the gas within the blending container 32 to safely relieve pressure from the internal pressure zone, as shown in FIG. 11. The gasket 232, however, also maintains its operative position between the blending container 32 and the blade base 28 so that material within the blending container 32 does not leak as shown in FIG. 12.

In operation, if the user requires the blending system 20 to perform a recipe requiring a longer operation time, the friction of the spinning blade 124 may generate heat within the blending container 32. As the heat in the blending container 32 increases, so does the pressure. As the operation continues, the pressure may continue to build up to a predetermined level. If the force of the internal pressure zone increases above that predetermined level, the gasket 232 is configured to displace that internal pressure to allow interior pressure to escape into the atmosphere. The shape of the gasket 232 allows the internal gas of the blending container 32 to escape while the solids and liquids remain within the blending container 32. Thus, the pressure within the blending container 32 is generally prevented from exceeding a predetermined level.

The blending system 20 may, however, include a spill moat 236 if any liquid escapes from the blending container 32 either during operation, during insertion of the material to be blending or while expelling the material from the blending container 32. The spill moat 236 may be of any appropriate configuration and may be positioned in the pedestal 76. By way of a non-limiting example, the spill moat 236 may be positioned on the periphery of the pedestal 76. The spill moat 236 may be configured to capture any escaping liquid and allow it to flow along a predetermined path. At a conclusion of the predetermined path of the spill moat 236, the blender base 24 may include at least one aperture 238. The aperture 238 may be configured to allow the liquid to exit from the blending system 20. The combination of the spill moat 236 and aperture 238 may generally prevent liquid from inadvertently entering the blender base 24 and more specifically from entering the working components of the blending system 20, such as the motor 40.

Figure 14:
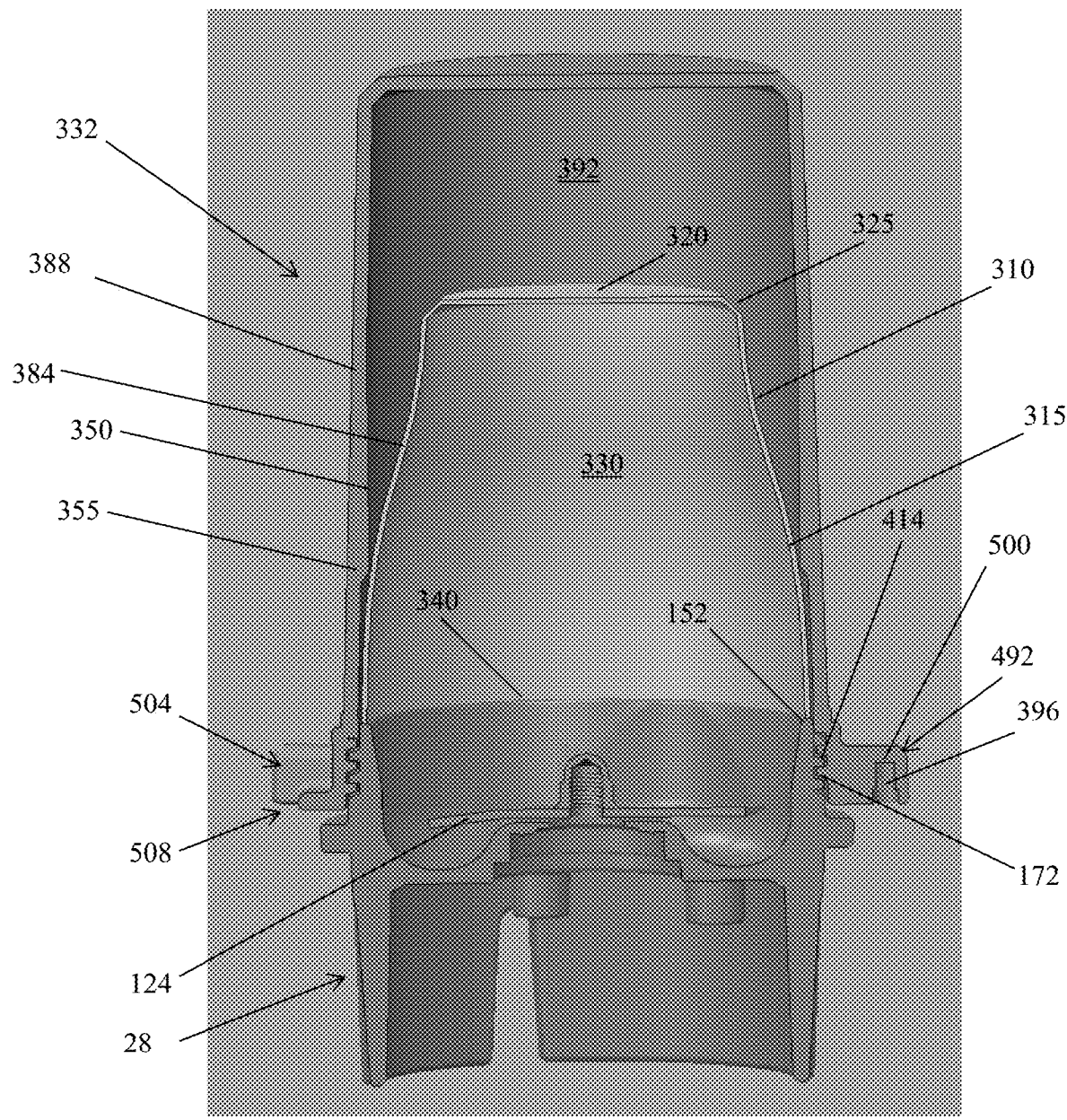
FIG. 14 is a cross sectional view of embodiments of a blender container including a liner, an outer sleeve and a blade base.
Figure 15:
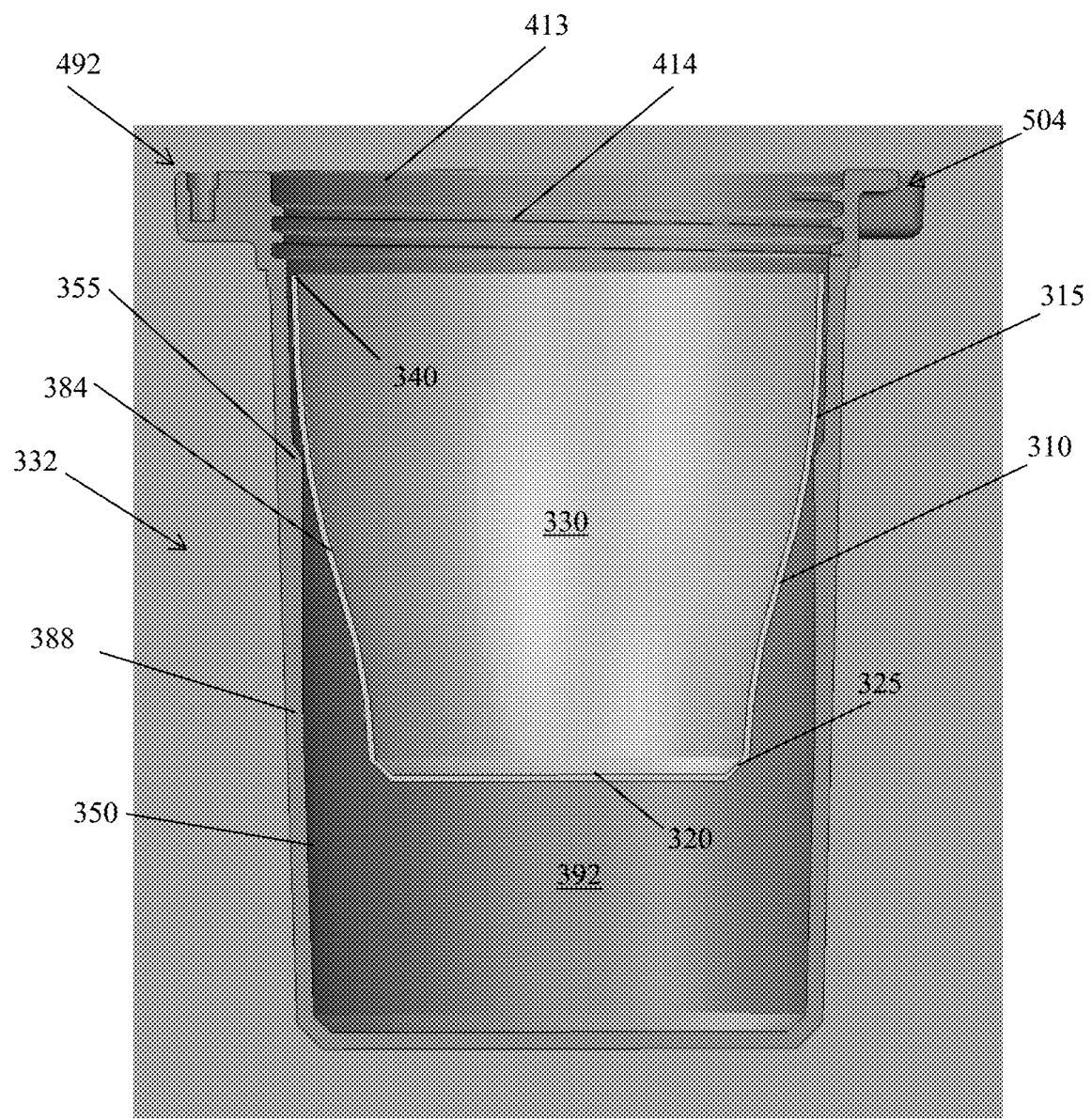
FIG. 15 is a cross sectional view of the blender container of FIG. 14 without the blade base.

As illustrated by FIGS. 14 and 15, the blending system 20 may include a third blending container 332 of a different configuration than the first and second blending containers 32, 233. The third blending container 332 may include an inner liner 384 and an outer sleeve 388 spaced from the inner liner 384. A space 392 may be formed between the inner liner 384 and outer sleeve 388 or the inner liner 384 may be immediately adjacent, e.g., touching, the outer sleeve 388. It is noted that the outer sleeve 388 may comprise similar aspects as first and second blending containers 32, 233. As such, the inner liner 384 may be utilized with the first and second blending containers 32, 233.

As described above, the third blending container 332 and blade base 28 may include the interlock feature 34. The interlock feature 34 may be of any appropriate configuration to generally prevent access to the blade 124 when it is spinning. As shown in FIG. 14, for example, the outer sleeve 388 of the third blending container 332 may include a first tab 492 extending therefrom. The first tab 492 may extend from the outer sleeve 388 and include a magnet 396 embedded therein. The at least one magnet 396 may be secured with the blending container 332 in any appropriate manner. By way of a non-limiting example, the magnet 396 may be welded into a pocket 500 formed in the first tab 492 extending from the outer sleeve 388 of the third blending container 332. In a further non-limiting example, the magnet 396 may be adhered, such as through use of an adhesive on the first tab 492 of the blending container 32. It is noted that the interlock feature 34 may utilize other devices, such as wireless transmitters (e.g., NFC transmitters). Moreover, the interlock feature 34 may communicate with a blender base. As an example, an NFC tag within the third blending container 332 may communicate identification information (e.g., a make/model of the third blending container 332, etc.) to the blender base. The blender base may determine or select available blending programs for the blending container 332 based on the identification information.

Further, as shown, the outer sleeve 388 of the third blending container 332 may include a second tab 504 extending therefrom. The second tab 504 may be of a similar configuration as the first tab 492, but may be of a different size. Further, the second tab 504 may be offset from the first tab 492 along the circumference of the outer sleeve 388 of the third blending container 32 at an angle that is not 180 degrees. In other words, the first tab 492 and second tab 504 may not be aligned with one another, as described herein. The second tab 504 may include a second magnet 508 embedded therein. The second magnet may be welded or otherwise embedded into a second pocket formed in the second tab 504 extending from the outer sleeve 388 of the third blending container 32. In a further non-limiting example, the second magnet may be adhered, such as through use of an adhesive, to the second tab 504. While the first tab 492 and second tab 504 are shown and described, any number of tabs may be utilized. In another aspect, any number of magnets may be used without departing from the present teachings. Further still, the number of tabs and magnets utilized are not limited to that shown. Any appropriate number of tabs and magnets may be utilized, e.g., three, four, etc.

In these embodiments, the first magnet 396 and second magnet 508 may be positioned in the tabs 492 and 504, respectively. The inner liner 384 and outer sleeve 388 may be separate members that are interchangeable. In one embodiment, the third blending container 332 may include an engaging portion 414 configured to operatively and selectively engage with the blade base 28. The engaging portion 414 may be of any appropriate configuration and type, including, without limitation being a threaded portion, a bayonet engaging member, or the like. Regardless of the configuration of the engaging portion 414, when secured to with a threaded portion 172 along an outer surface of the blade base 28, additional blending space may be created between an interior portion of the blade base 28 and an open end 413 of the third blending container 332. The engagement portion 414 may include a plurality of threads integrated with an inner surface of the outer sleeve 388. The threaded portion 414 would engage with the threaded portion 172 along an outer surface of the blade base 28.

The inner liner 384 may include a wall 310 and a bottom 320 such that the wall 310 extends from a perimeter 325 of the bottom 320 to define a cavity 330. The wall 310 may include a rim 340 that defines an opening to the cavity 330. The rim 340 may comprise threads, a lip, or the like. In one instance, the rim 340 may be partially disposed between the wall 310 may include a profile shape configured to fit within the outer sleeve 388. In one embodiment, the cavity 330 of the inner liner 384 may fill 8 fluid ounces, 12 fluid ounces or 16 fluid ounces of foodstuff—although it may be of any appropriate shape and size and is not limited to the sizes set forth herein. Foodstuff to be blended may be placed within the cavity 330 of the inner liner 384 as the inner liner 384 is placed within the outer sleeve 388. The outer sleeve 388 may be interchangeable with a plurality of the inner liners 384 of different sized cavities 330 (e.g., 8 oz., 12 oz., and 16 oz.). For example, the inner liner 384 may be disposable. The outer sleeve 388 may be sized to accept differently sized inner liners. In at least one embodiment, the profile of the wall 310 of the inner liner 384 may be shaped with a radially bulbous portion 315 that extends radially outwards relative to the radius dimension of the bottom perimeter 325. The radially bulbous portion 315 may at least partially frictionally abut against an inner surface 350 of the outer sleeve 388. This may retain the inner liner 384 in place without the need for other mechanisms (e.g., the inner liner 384 may be quickly placed or removed without spinning or other actions), may prevent the inner liner from deforming, or the like. For instance, the inner liner 384 may comprise a disposable plastic, paper, or foam cup. Certain ingredients may move about in the inner liner 384 during blending. Some hard ingredients tend to impact sides of the inner liner 384 at forces that may damage the inner liner 384. As the inner liner 384 contacts the inner surface 350 of the outer sleeve 388, the inner surface 350 may absorb the impact and generally prevent or reduce damage to the inner liner 384.

In at least one embodiment, the inner surface 350 may include an annular shoulder 355 that protrudes from the inner surface 350 to align and support the inner liner 384 within the outer sleeve 388 in frictional engagement. The annular shoulder 355 may be generally continuous about the inner surface 350 or may include various spaces located along the inner surface 350 of the outer sleeve 388. The annular shoulder 355 may be angled in various arrangements and include various profile shapes that protrude from the inner surface 350 of the outer sleeve 388, and may form a ledge or ridge in the inner surface 350. In at least some embodiments, the wall 310 of the inner liner 384 may comprise a ledge or annular shoulder that interacts with the shoulder 355. For instance, the inner liner 384 may comprise an annular shoulder that is similarly sized, angled, and shaped with the shoulder 355 such that the two shoulders mate and cooperate with each other. The bulbous portion 315 may include any type of profile shape to allow the inner liner 384 to frictionally engage the outer sleeve 388 and this disclosure is not limiting. The wall 310 or bulbous portion 315 of the wall 310 of the inner liner 384 may slightly deform inwardly for snug engagement thereof thereby preventing further movement of the inner liner 384 within the outer sleeve 388.

Additionally, the outer sleeve 388 of one size may receive various sizes of the inner liner 384. The wall 310 of the inner liner may extend while the radial bulbous portions 315 of the various sizes of inner liners 384 may remain sized to frictionally abut the inner surface 350 of the outer sleeve 388. This may allow one outer sleeve 388 to be sized to fit various sizes of inner liners 384 wherein the wall 310 and bottom 320 of the inner liner 384 may be received within the space 392 of the third container 332 as illustrated by FIGS. 14 and 15.

As illustrated by FIG. 14, the blade base 28 may engage the outer sleeve 388 such that the engagement portion 414 of the outer sleeve 388 engages the engagement portion 172 of the blade base 28. The rim 340 of the inner liner 384 may be configured to abut against the open top end 152 of the blade base 28 as the engagement portions 414, 172 are attached. The rim 340 may abut the open top end 152 as the bulbous portion 315 of the wall 310 frictionally engages against the inner surface 350 of the outer sleeve 388.

The foodstuff within the cavity 330 may be exposed to the blade 124 may be partially disposed between the blade base 28 and contained in the resulting space defined by the blade base 28 and the cavity 330. In this engaged position, the blade base 24 may be inserted within the opening 116 in the pedestal 76 in any appropriate manner such that the blade 124 rotatably engages the motor 40 as the outer sleeve 388 may be operably attached to the blender base 24. Additionally, the gasket 232 may be configured to seal the third container 332 to the blender base 24 as discussed herein.

In one embodiment, the inner liner 384 may be a container that made from generally inexpensive materials that may also be disposable. Additionally, a lid (not shown) may be provided that generally conforms and operably attaches to the rim 340 of the inner liner 384 that may retain the blended foodstuffs therein and make storing blended ingredients in the inner liner convenient. Similarly, a user may add the ingredients intended to be blended into the liner 384 and store it in advance of blending. In fact, the inner liner 384 may be of such an inexpensive construction that a user may be able to purchase multiple inner liners 384 fill them up with ingredients to be stored and then insert the inner liner 384 into the outer sleeve 388 to conduct the blending as described below. Further still, the inner liners 384 may come prepackaged such that a user can purchase such, insert it into the outer sleeve 388 and blend. This may provide a means for companies to sell pre-packaged ingredients for blending. In fact, the supplier may be able to position such items in the inner liner 384 in the proper order to assist with blending such ingredients.

In operation, ingredients may be inserted into the cavity 330 of the inner liner 384. Then, the blade base 28 may be threadingly engaged to the outer sleeve 388 and inner liner 384. The inner liner 384 may be held inside the outer sleeve 388 by the blade base 28. This assembly may then be put on to the blender base for blending. After blending, the blade base may be removed from the outer sleeve 388 and the inner liner 384. The inner liner 384 may be removed from the outer sleeve 388 with the blended ingredients inside the cavity 330.

There may be various ways to extract the inner liner 384 from the outer sleeve 388 without placing a user's fingers into the blended ingredients. One embodiment may include a secondary base part (not shown) the outer sleeve would sit upon to push out the inner liner. Another embodiment may be a flexible part inside the sleeve (not shown) that would compress as the threads are tightened together placing a force against the inner liner 384 such that as the blade base 28 is removed, the inner liner 384 may bias away from its frictional abutment with the outer sleeve 388. The outer sleeve 388 would remain clean and another inner liner 384 may be placed into the outer sleeve 388 for additional subsequent blending. Further, another embodiment, may be an aperture positioned along the outer sleeve 388 that is configured to allow a mating part such a spatula handle or protrusion to be inserted into the aperture to press against the inner liner 384 and disengage the inner liner 384 from the outer sleeve 388. Further, an aperture may also provide pneumatic pressure relief for the third container 332. Further still, a push button may be utilized, a handle (both a fixed handle and removable one), ears on the inner liner 384, a tab, or any other mechanism may be utilized without departing from the present teachings.

As shown in FIGS. 13-15, the first and second recessed portions 220, 224 of the lip 216 in the pedestal 76 of the blender base 24 may be configured such that the first tab 492 and the second tab 504 of the outer sleeve 388 are selectively and operatively engageable with such first and second recessed portions 220, 224. The first recessed portion 220 may be shaped and sized such that only the first tab 492 may be capable of operatively engaging it. Similarly, the second recessed portion 224 may be shaped and sized such that only the second tab 504 is operatively engageable therewith. This configuration may help align the outer sleeve 388 of the third blending container 332 and blade base 28 with the blender base 24. As noted above regarding the relative positions of the first tab 492 and second tab 504, the first and second recessed portions 220, 224 may be offset from one another such that they are not aligned at 180 degrees with respect to one another.

Further each of the first and second recessed portions 220, 224 may include a sensor, such as a reed switch or Hall Effect sensor (not shown) in its proximity. The reed switch may be utilized to indicate when both of the first tab 492 and second tab 504 are operatively positioned within the first and second recesses 220, 224. Contacts of the reed switch may be in normally open position when the magnets 496 and 508 are not in proximity thereto, i.e., when the tabs 492 and 504 are not positioned in the first and second recessed portions 220, 224. When the magnets 496 and 508 within the tabs 492, 504, respectively, are moved in operative proximity to the reed switch, the reed switch will close, i.e., the reed switch will close when a magnetic field is present. Once the magnets 496 and 508 are moved away from the switch, the reed switch will go back to its original open position.

When the reed switch is in the open position, the motor 40 is configured to be disabled, i.e., not operate. When the motor 40 is disabled, the blade base 28 and more particularly, the blade 124 is not capable of operation. Therefore, in order to operate the blending system 20, the third blending container 332 and blade base 28 must be operatively coupled with the blender base 24. Specifically, the tabs 492 and 508 must be operatively positioned within the first and second recessed portions 220, 224, respectively in order for the blending system 20 to operate. This generally prevents the user from being able to access or otherwise contact the blade 124.

The aforementioned interlock feature 34 is further configured to generally prevent circumvention by a user. For example, the reed switch may be calibrated to disengage or disable the motor 40 anytime the first magnet 396 or second magnet 508 or both are a predetermined distance away from the reed switch. The predetermined distance may be calibrated so that the user may not create enough space between the blending container 332, blade base 28 or blender base 24 to access the blade 124.

While the blending system 20 is operating, i.e., the motor 40 is operating, the blending system 20 tends to attempt to rotate the blending container 332 relative to the blender base 24. The tabs 492 and 504 being engaged with the first and second recessed portions 220, 224, respectively may prevent the blending container 32 from rotating—it may maintain the blending container 332 in its operative position with respect to the blender base 24. The tabs 492 and 504 may be generally rectangular in shape. Further, the corresponding first and second recessed portions 220, 224 may be of a corresponding rectangular shape. The rectangular shape may provide the anti-rotation feature generally keeping the interlock feature 34 operatively aligned.

Many separate inner sleeves 384 may also be used for serving, storage, and transport and may apply to any other blender designs where the adaptive parts or interlocks would not be repeated in the inner sleeve 384 or simple storage containers. The user may have many disposable or otherwise less expensive blended product storage containers without interlock protrusions such as tabs 492, 504.

Although the embodiments of the present teachings have been illustrated in the accompanying drawings and described in the foregoing detailed description, it is to be understood that the present teachings are not to be limited to just the embodiments disclosed, but that the teachings described herein are capable of numerous rearrangements, modifications and substitutions without departing from the scope of the claims hereafter.

Having thus described the invention, the following is claimed:

1. A blending system for mixing a product with a blender base comprising:
   a blade base comprising a blade and a housing, the blade base housing configured to attach to the blender base;
   a removable inner liner comprising a rim, a bottom, and a sidewall extending between the rim and the bottom, the sidewall and the bottom defining an internal cavity, and the inner liner configured to contact the blade base such that the internal cavity is accessible to the blade; and
   an outer sleeve configured for receiving the inner liner, the outer sleeve comprising:

an engaging portion configured for releasably coupling to the blade base to secure together the outer sleeve, the inner liner and the blade base; and an annular shoulder offset from the engaging portion and configured to at least partially surround an exterior of the inner liner and contact the sidewall spaced from the rim when the inner liner is secured together with the outer sleeve and the blade base, the outer sleeve being spaced from the inner liner between the annular shoulder of the outer sleeve and the bottom of the inner liner.

2. The blending system of claim 1, wherein the inner liner is made from a disposable material.

3. The blending system of claim 1, wherein the sidewall of the inner liner operatively mates with the annular shoulder.

4. The blending system of claim 1, wherein the rim defines an opening and operatively abuts against the blade base.

5. The blending system of claim 4, wherein the rim is configured to abut against an open top end of the blade base.

6. The blending system of claim 1, further comprising a reed switch in proximity to at least one recessed portion of the blender base, wherein when at least one interlock tab is engaged with the least one recessed portion of the blender base, a blender motor is engaged.

7. The blending system of claim 1, wherein the inner liner includes a size of at least one of 8, 12, and 16 fluid ounces.

8. The blending system of claim 7, wherein the outer sleeve is configured to receive the inner liner that includes a size of 8 fluid ounces, 12 fluid ounces, and 16 fluid ounces.

9. The blending system of claim 1, wherein the outer sleeve comprises a cavity.

10. The blending system of claim 1, wherein the outer sleeve comprises a closed end.

11. A blending system, comprising:
a blender base comprising a motor and a motor drive shaft;
a blade base, comprising a blade and a housing, wherein the housing is configured to connect to the blender base and wherein the motor drive shaft is configured to rotate the blade;
a container operatively coupled to the blade base, the container comprising:
an outer sleeve having an inner surface, an annular shoulder, and an engaging portion configured for engagement with the blade base and offset from the annular shoulder; and
a first inner liner and a second inner liner, wherein each of the first inner liner and the second inner liner comprises a wall that extends from a perimeter of a bottom to a rim, the wall defines a cavity to retain foodstuff to be blended,
wherein at least a portion of the wall spaced from the rim frictionally engages against a portion of the annular shoulder of the outer sleeve,
wherein the first inner liner and the second inner liner comprises different volumetric sizes,
wherein the outer sleeve is configured for receiving the first inner liner or the second inner liner, and further configured for releasably coupling to the blade base to secure together the outer sleeve, the first inner liner or the second inner liner and the blade base, and
wherein the outer sleeve is spaced from the first inner liner or the second inner liner between the annular shoulder of the outer sleeve and the bottom of the first inner liner or the second inner liner.

12. The blending system of claim 11, wherein the first inner liner and outer sleeve are not coupled through other mechanisms.

13. The blending system of claim 11, wherein the first inner liner comprises a disposable material and the outer sleeve comprises a different material and is non-disposable.

14. The blending system of claim 11, wherein the first inner liner is operatively threadedly engaged with the outer sleeve and the blade base.

15. The blending system of claim 11, wherein the blender base comprises at least one recess operatively receiving at least one interlock tab.

16. The blending system of claim 11, wherein the first inner liner comprises a release mechanism that includes at least one of a handle attached with the first inner liner, a push button on the outer sleeve, an aperture positioned on the outer sleeve sized to permit access to the first inner liner to disengage the first inner liner from the outer sleeve, or a tab on the first inner liner.

17. The blending system of claim 11, wherein the outer sleeve comprises a cavity.

18. The blending system of claim 11, wherein the outer sleeve comprises a closed end.

19. A blending system, comprising:
a blender base comprising a motor;
a blade base comprising blades capable of blending foodstuff;
a container directly and operatively coupled to the blade base, the container having a closed end opposite the blade base such that the container is configured as a drinking vessel and configured to have foodstuff blended therein;
a removable inner liner selectively positionable in the container, the removable inner liner comprising a rim, a bottom, and a sidewall extending between the rim and the bottom, and the removable inner liner configured to have foodstuff blended therein; and
an annular shoulder configured to at least partially surround an exterior of the removable inner liner and contact the sidewall spaced from the rim when the removable inner liner is secured together with the container and the blade base, the container being spaced from the inner liner between the annular shoulder of the outer sleeve and the bottom of the inner liner.

* * * * *